(12) United States Patent
Li

(10) Patent No.: US 12,726,226 B2
(45) Date of Patent: Sep. 1, 2026

(54) TRANSMITTER CIRCUIT HAVING ADDITIONAL DELAY PATH

(71) Applicant: AMAZING MICROELECTRONIC CORP., New Taipei City (TW)

(72) Inventor: Guan-Shun Li, Zhubei City (TW)

(73) Assignee: AMAZING MICROELECTRONIC CORP., New Taipei City (TW)

( * ) Notice: Subject to any disclaimer, the term of this patent is extended or adjusted under 35 U.S.C. 154(b) by 0 days.

(21) Appl. No.: 18/965,460

(22) Filed: Dec. 2, 2024

(65) Prior Publication Data

US 2026/0155856 A1 Jun. 4, 2026

(51) Int. Cl.

*H04B 1/38* (2015.01)
*H04B 1/04* (2006.01)
*H04B 1/40* (2015.01)

(52) U.S. Cl.

CPC ............ *H04B 1/40* (2013.01); *H04B 1/0475* (2013.01)

(58) Field of Classification Search

CPC ................................ H04B 1/40; H04B 1/0475
USPC ........................................ 375/219, 295, 316
See application file for complete search history.

(56) References Cited

U.S. PATENT DOCUMENTS 11,502,718 B1 * 11/2022 Li .......................... H03K 19/20
11,515,900 B1 * 11/2022 Li ........................... H04B 1/04
2015/0171901 A1 * 6/2015 Dupuis ................ H04B 10/802 375/295

FOREIGN PATENT DOCUMENTS

| | | | |
|---|---|---|---|
| CN | 118100901 | A | 5/2024 |
| TW | 253082 | | 8/1995 |
| TW | I737529 | B | 8/2021 |
| TW | I758230 | B | 3/2022 |
| TW | I785821 | B | 12/2022 |

* cited by examiner

*Primary Examiner* — Zewdu A Kassa
(74) *Attorney, Agent, or Firm* — Birch, Stewart, Kolasch & Birch, LLP

(57) ABSTRACT

A transmitter circuit is provided having an additional delay path. A first transmitter output signal is generated according to a rising edge and falling edge of its data input signal. A second transmitter output signal is generated by delaying the first transmitter output signal. The disclosed transmitter circuit includes a rising and falling converter for outputting a converted data input signal, a delay and logic unit for receiving the converted data input signal and generating a carrier signal, an AND gate receiving the converted data input signal and the carrier signal, and outputting the first transmitter output signal, and a delay circuit receiving the first transmitter output signal and outputting the second transmitter output signal. Robustness and common mode voltage stability can be enhanced. Due to a definite and limited number of pulses of the carrier signal, the invention also achieves to reduce power consumption and electromagnetic interferences effectively.

23 Claims, 16 Drawing Sheets

TRANSMITTER CIRCUIT HAVING ADDITIONAL DELAY PATH

BACKGROUND OF THE INVENTION

Field of the Invention

The present invention is related to a transmitter circuit layout diagram. And more particularly, the present invention is related to a transmitter circuit structure having an additional delay path. The disclosed transmitter circuit is characterized by having an additional delay path, and is applicable to a digital isolator module, such that the signal at the receiver input terminal can be enhanced by at least two times, thereby greatly improve the robustness of data transmission and avoid the common mode voltage instability at the same time.

Description of the Prior Art

As we know, isolation circuits are the interface circuits that provide galvanic isolation between two communicating blocks, for example, a transmitter circuit (TX) and a receiver circuit (RX). Such isolation circuits are required to eliminate avoidable ground loops, and also to protect high voltage sensitive circuits. It is believed that these circuits ensure electric insulation and signal isolation between the circuits, ensuring reliable data transmission between the two circuits, isolating the signal from fast transient common mode noise. In certain applications, where the common mode noise can be expected and human interactions are inevitable (e.g., cardiograph), then the isolation circuits usually act as an interface, which ensures safety and reliability. In several industrial applications which are susceptible to electrical surges, it mostly adopts fast transients, high noise floors, as well as isolation circuits which have been widely used for safety and reliability.

Please refer to FIG. 1, which schematically shows a functional block of a conventional isolation circuit architecture. As can be seen in FIG. 1, according to the conventional isolation circuit architecture, the two main communicating blocks, including the transmitting circuit 10 and the receiving circuit 20 are electrically connected to a first ground voltage $V_{ss1}$ and a second ground voltage $V_{ss2}$, respectively. The isolation circuit is aimed to isolate these two ground voltages (i.e. the first ground voltage $V_{ss1}$ and the second ground voltage $V_{ss2}$) apart. As a result, the isolation capacitances 22 are configured between the transmitting circuit 10 and the receiving circuit 20 for electrical isolation. Specifically, in a conventional transmitting circuit structure, the transmitting circuit 10 may include transmitters TX_1 and TX_2, and each transmitter TX_1 and TX_2 is composed of an oscillator 11 and a mixer 12. As shown in FIG. 1, DI is an input of the transmitting circuit 10 and by employing the transmitters TX_1 and TX_2 to generate the TX output signals TXO_1 and TXO_2. The isolation capacitances 22 are configured between the transmitting circuit 10 and the receiving circuit 20 for coupling the TX output signals TXO_1 and TXO_2 from the transmitter side to the receiver side, so as to generate the RX input signals RXIN_1 and RXIN_2 for the receiving circuit 20 to receive. The receiving circuit 20 includes receivers RX_1, RX_2 and a mixer 21. The receiver RX_1 receives the RX input signal RXIN_1, the receiver RX_2 receives the RX input signal RXIN_2, and by employing the mixer 21 connected thereto, an output signal RO is generated.

FIG. 2 schematically shows the plurality of waveforms of the input signal DI, the TX output signals TXO_1 and TXO_2, the oscillator 11, the RX input signals RXIN_1 and RXIN_2, and the output signal RO in accordance with the conventional isolation circuit architecture in FIG. 1. In general, a voltage level of the input signal DI is expected to be followed by the voltage level of the output signal RO. However, as illustrated in FIG. 1, what draws our attention is that in a conventional design module of the conventional isolation circuit architecture, an oscillator 11 is generally and inevitably used in the transmitter structure. Under such a condition, once the isolation circuit is powered on, the oscillator 11 starts to continuously output indefinite pulse carriers as shown in FIG. 2. And as illustrated in FIG. 2, it can be understood that, such indefinite pulse carriers generated from the oscillator 11, result in causing tremendous power consumption and severe electromagnetic interference (EMI) issues. Moreover, since the oscillator 11 generates and provides indefinite pulse carriers at all times even when the input signal DI is in transition from the logic state "0" to "1" or from the logic state "1" to "0", the TX output signals TXO_1 and TXO_2 are very likely to have the jitter problems.

In addition, as shown in the conventional isolation circuit architecture in FIG. 1, it can be seen that at least two pairs of transmitters TX_1, TX_2 corresponding to receivers RX_1, RX_2 are necessary to be disposed in a conventional isolation circuit structure. As such, in such a conventional design architecture, circuit production cost and area consumption are also problems to be faced and solved. As a result, it is believed that such conventional design is still in lack of extensive utility and can not be widely used.

Under such circumstances, it, in view of all, should be apparent and obvious that there is indeed an urgent need for the professionals in the field for a novel and inventive transmitter circuit architecture to be developed, especially without the needs for oscillator configuration so as to solve the above mentioned issues, and to reduce power consumption and electromagnetic interferences at the same time.

SUMMARY OF THE INVENTION

In order to overcome the above mentioned disadvantages, one major objective in accordance with the present invention is provided for a novel and creative transmitter circuit structure which is applicable to a digital isolator module and advantageous of reducing power consumption and electromagnetic interferences. Thereby, the present invention achieves to successfully solves the problems of prior arts and meanwhile maintain precise data transmission result as well as good system robustness.

Another objective in accordance with the present invention is provided for a novel transmitter circuit structure, in which no conventional oscillator is required. The inventive transmitter circuit uses a new circuit configuration to replace the conventional oscillator, and since the conventional oscillator disposed in the transmitter circuit is spared, the prior power consumption and severe electromagnetic interference issues are therefore, eliminated. Moreover, jitters of the output signals from the transmitter circuit can be avoided at the same time.

And yet another objective in accordance with the present invention is provided for a transmitter circuit which is characterized by having an additional delay path. The disclosed transmitter circuit is composed of a rising and falling converter, a delay and logic unit, an AND gate and a delay circuit. By integrating these circuits with equivalent simplicity, the transmitter circuit architecture is successful in preserving relatively low complexity and thus can be widely utilized in any related industries.

For achieving the above mentioned objectives, the present invention is aimed to provide a transmitter circuit having additional delay path. The disclosed transmitter circuit having additional delay path is applicable to a digital isolator module, which comprises a receiver circuit and an isolation barrier connected between the transmitter circuit and the receiver circuit. The transmitter circuit is adapted to receive a data input signal and coupled to the isolation barrier, and the transmitter circuit is operable to generate a first transmitter output signal and a second transmitter output signal in response to the data input signal. According to the embodiment of the present invention, the second transmitter output signal is a delay signal of the first transmitter output.

The isolation barrier is coupled to the transmitter circuit and is operable to receive the first transmitter output signal and the second transmitter output signal, and the isolation barrier is operable to develop a first isolated output signal and a second isolated output signal respectively in response to the first transmitter output signal and the second transmitter output signal.

By such configurations, the receiver circuit is coupled to the isolation barrier and receiving the first isolated output signal and the second isolated output signal, such that the receiver circuit is operable to generate a data output signal in response to the first isolated output signal and the second isolated output signal.

According to the embodiment of the present invention, the transmitter circuit is operable to generate the first transmitter output signal (TXO) in response to the data input signal. And the first transmitter output signal (TXO) comprises a first division signal and a second division signal, and the transmitter circuit starts to generate the first division signal of the first transmitter output signal responsive to a first transition of the data input signal from a first logic state to a second logic state and terminate generating the first division signal of the first transmitter output signal when the data input signal is still in the second logic state.

Moreover, the transmitter circuit starts to generate the second division signal of the first transmitter output signal responsive to a second transition of the data input signal from the second logic state to the first logic state and terminate generating the second division signal of the first transmitter output signal when the data input signal is still in the first logic state. According to a preferred embodiment of the present invention, a first operational time of the first division signal of the first transmitter output signal and a second operational time of the second division signal of the first transmitter output signal are different. And, the first transmitter output signal (TXO) is periodic since a voltage level of the data input signal should be followed by the voltage level of the first transmitter output signal (TXO) and the data input signal DI is periodic In a preferred embodiment of the present invention, the disclosed transmitter circuit having additional delay path comprises a rising and falling converter, a delay and logic unit and, an AND gate and a delay circuit. The rising and falling converter is adapted to receive the data input signal and accordingly output a converted data input signal in response to a rising edge and a falling edge of the data input signal. The converted data input signal comprises a first partition signal and a second partition signal, and the rising and falling converter starts to generate the first partition signal responsive to the rising edge of the data input signal and terminate generating the first partition signal before the falling edge of the data input signal. And, the rising and falling converter starts to generate the second partition signal responsive to the falling edge of the data input signal and terminate generating the second partition signal before a next rising edge of the data input signal. And, a first working time of the first partition signal of the converted data input signal and a second working time of the second partition signal of the converted data input signal are different.

The delay and logic unit is adapted to electrically connect with the rising and falling converter for receiving the converted data input signal and accordingly generating a carrier signal, wherein the carrier signal comprises a plurality of pulses between the rising edge of the data input signal and the falling edge of the data input signal. According to the embodiment of the present invention, a number of the plurality of pulses of the carrier signal is limited and definite.

The AND gate is electrically connected with the rising and falling converter and the delay and logic unit for receiving the converted data input signal and the carrier signal, and outputting the first transmitter output signal.

And the delay circuit is being electrically connected with the AND gate, such that the delay circuit is operable to receive the first transmitter output signal, delay the first transmitter output signal and output the second transmitter output signal.

According to one embodiment of the present invention, the second transmitter output signal, for instance, can be obtained by delaying the first transmitter output signal by a half period of duty time ($T*\frac{1}{2}$) of the first transmitter output signal (TXO), wherein T is a duty time of the first transmitter output signal (TXO).

To be more specific, according to one embodiment of the present invention, the delay circuit may be configured as comprising at least one inverting unit, and the at least one inverting unit is forming by electrically connecting two inverters in series, such that the least one inverting unit is operable to receive the first transmitter output signal (TXO), delay the first transmitter output signal (TXO) and output the second transmitter output signal (TXOD). In one embodiment, when the delay circuit comprises a plurality of the inverting units, then the plurality of the inverting units can be electrically connected in cascade for receiving the first transmitter output signal (TXO) and outputting the second transmitter output signal (TXOD).

In another aspect, according to the embodiment of the present invention, the first transition of the data input signal from the first logic state to the second logic state is in response to the rising edge of the data input signal. And the second transition of the data input signal from the second logic state to the first logic state is in response to the falling edge of the data input signal.

The first operational time of the first division signal of the first transmitter output signal (TXO) is equal to the first working time of the first partition signal of the converted data input signal, and the second operational time of the second division signal of the first transmitter output signal (TXO) is equal to the second working time of the second partition signal of the converted data input signal.

In a preferred embodiment of the present invention, the delay and logic unit may comprise multiple delay cells, multiple multiplexers and an OR gate. The multiple delay cells are connected in series to receive the converted data input signal, delay the converted data input signal sequentially and output multiple delayed signals, wherein a signal delay time of each of the multiple delay cells is one period.

Each of the multiple multiplexers includes two input ends and an output end, wherein the two input ends are electrically connected to successive two of the converted data input signal and the multiple delayed signals to accordingly generate a multiplexer signal at the output end.

The OR gate is adapted to receive a plurality of the multiplexer signal from the output end of the multiple multiplexers and generate the carrier signal.

According to the embodiment of the present invention, the multiplexer signal turns to a high voltage level when a former one of the successive two of the converted data input signal and the multiple delayed signals is at the high voltage level and a later one of the successive two of the converted data input signal and the multiple delayed signals is at a low voltage level.

In another aspect, regarding the rising and falling converter configuration, the rising and falling converter comprises an inverter, a first transmission gate, a second transmission gate, a third transmission gate, a fourth transmission gate and an NOR gate, wherein the inverter receives the data input signal and outputs an inverted data input signal, a first input end of the NOR gate is electrically connected with the first transmission gate and the second transmission gate, and a second input end of the NOR gate is electrically connected with the third transmission gate and the fourth transmission gate. The first transmission gate and the third transmission gate are further connected with an input and an output of the inverter, respectively.

The data input signal is delayed by a first period and a second period to respectively control the first transmission gate and the fourth transmission gate, and the inverted data input signal is delayed by the first period and the second period to respectively control the second transmission gate and the third transmission gate, such that the NOR gate outputs the converted data input signal.

In one embodiment, when the first period is longer than the second period, the first working time of the first partition signal of the converted data input signal is longer than the second working time of the second partition signal of the converted data input signal.

In another embodiment, when the second period is longer than the first period, the second working time of the second partition signal of the converted data input signal is longer than the first working time of the first partition signal of the converted data input signal.

As a result, based on the above, it has been proved that the present invention is well designed and indeed discloses a novel transmitter circuit architecture for digital isolator fields. The whole new schemes can be employed in a transmitting circuit (TX) architecture and has been verified to succeed in minimizing system power consumption and electromagnetic interferences since a conventional oscillator circuit can be omitted in the transmitting circuit (TX) architecture. Meanwhile, superior system robustness and precise data transmission results are maintained.

Moreover, the disclosed transmitting circuit (TX) architecture is also characterized by having an additional delay path for generating the second transmitter output signal by means of delaying the first transmitter output signal (TXO). And due to such technical manners, it is believed that the receiving signals at the receiver input terminal (i.e. the first isolated output signal and the second isolated output signal) can be enhanced by at least two times, and as a result, the robustness of data transmission of the disclosed digital isolator module having an additional delay path, can be greatly improved. Meanwhile, the common mode voltage instability and common mode voltage drifts of the transmission data system by employing the proposed digital isolator module of the present invention, can be minimized and avoided at the same time.

On account of all, it is believed that the present invention is advantageous of having excellent control stability over system levels as well as maintaining precise control ability to the isolation circuits while compared to the prior arts.

These and other objectives of the present invention will become obvious to those of ordinary skill in the art after reading the following detailed description of preferred embodiments.

It is to be understood that both the foregoing general description and the following detailed description are exemplary and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
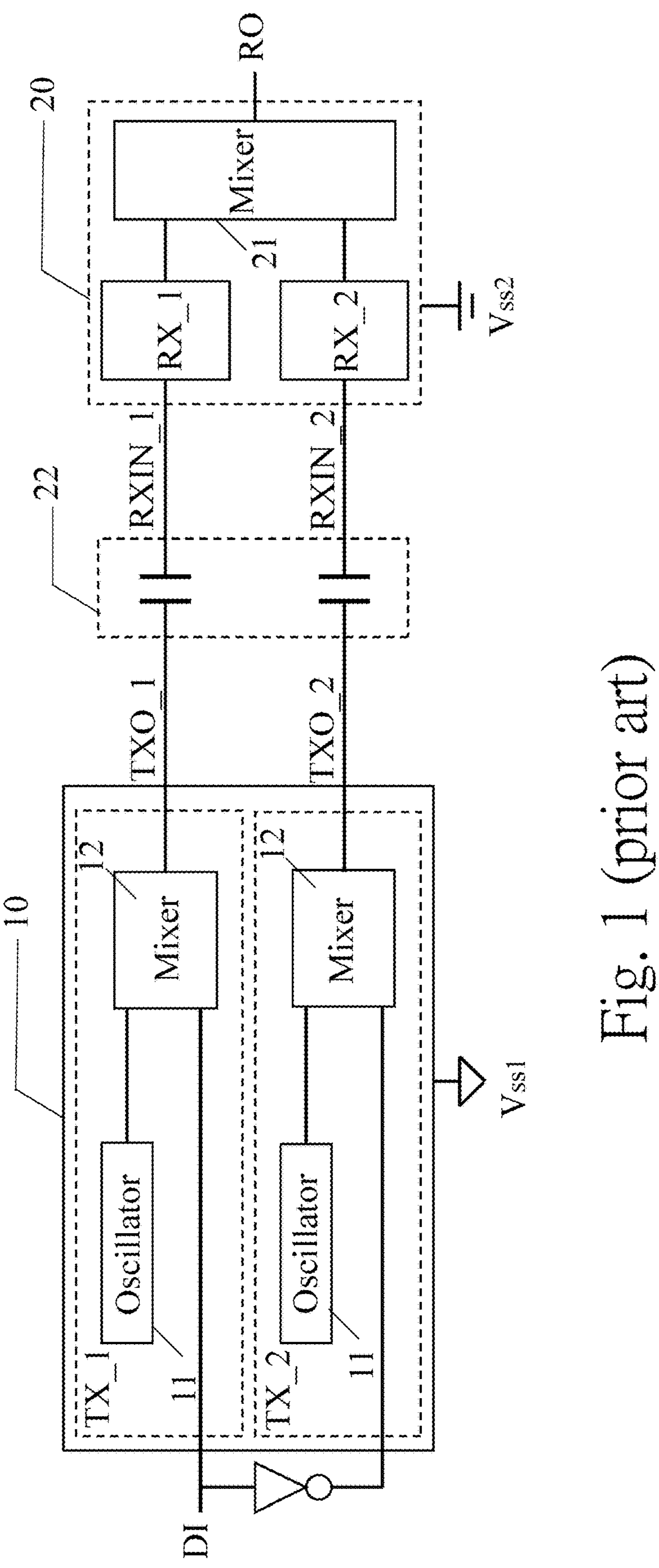
FIG. 1 schematically shows a functional block of a conventional isolation circuit architecture.
Figure 2:
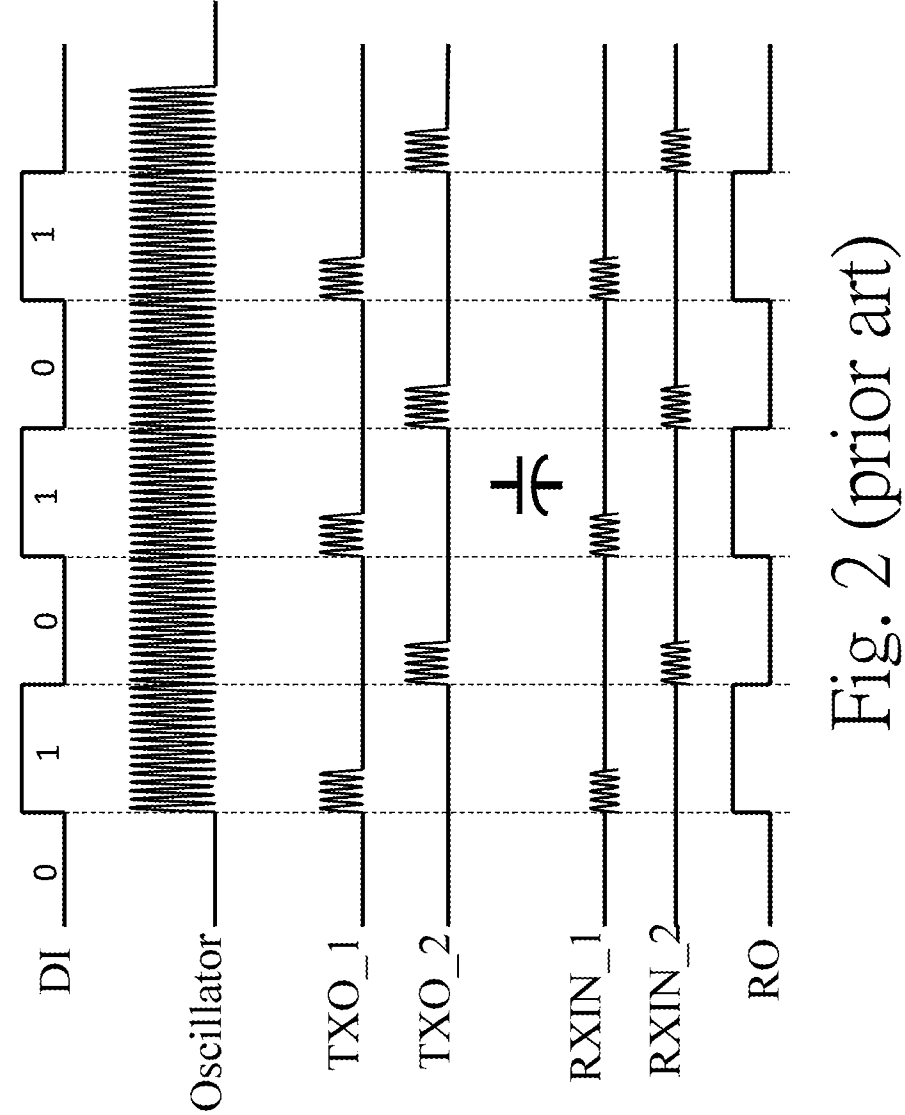
FIG. 2 shows the plurality of waveforms of the input signal, the TX output signals, the oscillator, the RX input signals and the output signal in accordance with the conventional isolation circuit architecture in FIG. 1.

Reference will now be made in detail to the preferred embodiments of the present invention, examples of which are illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

The embodiments described below are illustrated to demonstrate the technical contents and characteristics of the present invention and to enable the persons skilled in the art to understand, make, and use the present invention. However, it shall be noticed that it is not intended to limit the scope of the present invention. Therefore, any equivalent modification or variation according to the spirit of the present invention is to be also included within the scope of the present invention.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

The terms "substantially," "around," "about" and "approximately" can refer to within 20% of a given value or range, and preferably within 10%. Besides, the quantities provided herein can be approximate ones and can be described with the aforementioned terms if are without being specified. When a quantity, density, or other parameters includes a specified range, preferable range or listed ideal values, their values can be viewed as any number within the given range.

As the Applicants have described earlier in the Description of the Prior Art, since the conventional digital isolator module structure designs are mostly deficient owing to high circuit complexity and also in lack of circuit design flexibility, especially having the severe power consumption and electromagnetic interferences issues due to the oscillator configuration disposed in the conventional transmitter circuit architecture, mass productions are therefore difficult to be carried out. In addition, in the conventional digital isolator module structure designs, the current transmitter circuit (TX) is most likely to use conventional modulation techniques, such as On/Off Keying (OOK) modulation technique, Frequency Shift Keying (FSK) modulation technique, or Amplitude Shift Keying (ASK) modulation technique for data transmission and signal coupling. And these conventional signal modulation techniques have been acknowledged as causing severe power consumption and electromagnetic interferences. As a result, based on such drawbacks to be solved, the present invention is thus provided and aimed to solve these deficiencies by proposing a novel and inventive transmitter circuit layout structure, which is characterized by not only omitting the conventional oscillator configuration in the transmitter circuit, but also providing an additional delay path for generating another transmitter output signal. And therefore, by employing such modification and improvements, it is believed that the provided transmitter circuit having additional delay path is advantageous of showing extraordinary robustness of data transmission efficiency, while compared with the prior arts. In the following paragraphs, the Applicant of the present invention will be providing the detailed technical descriptions of the disclosed digital isolator module diagram, which will now be provided and illustrated by a plurality of variant embodiments as described in the following sections for your references.

Figure 3:
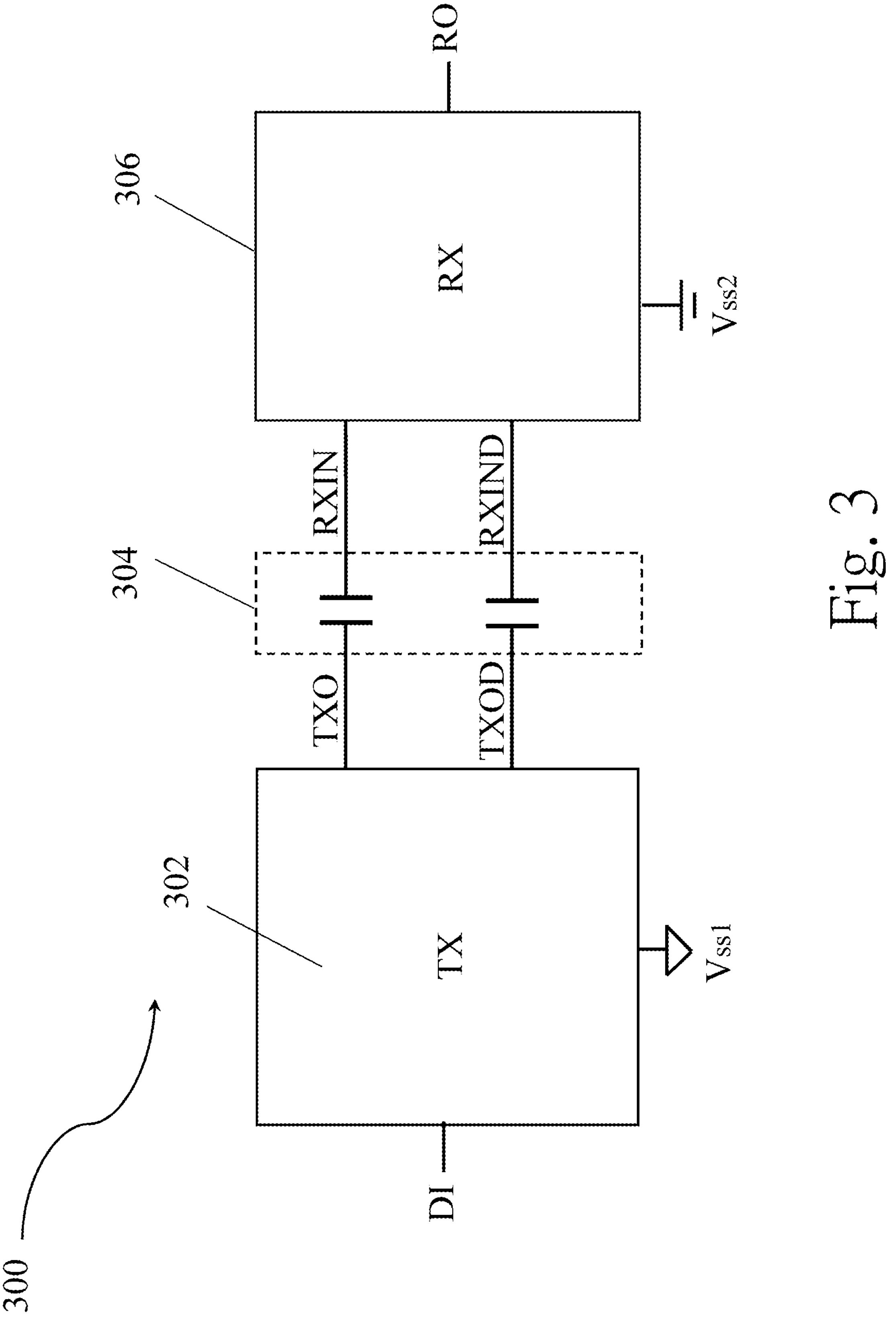
FIG. 3 schematically shows a functional block diagram of a digital isolator module in accordance with one main embodiment of the present invention.

As for the following technical descriptions, please refer to FIG. 3 first, in which FIG. 3 schematically shows a functional block diagram of a digital isolator module in accordance with one main embodiment of the present invention. According to the present invention, the proposed transmitter circuit 302 is applicable to a digital isolator module 300 and the proposed transmitter circuit 302 is characterized by having an additional delay path. As can be seen, the disclosed digital isolator module 300 may comprise a transmitter circuit (TX) 302, an isolation barrier 304 coupled to the transmitter circuit 302, and a receiver circuit (RX) 306 which is coupled to the isolation barrier 304. The transmitter circuit 302 is electrically connected to a first ground voltage level $V_{ss1}$ and the receiver circuit 306 is electrically connected to a second ground voltage level $V_{ss2}$. The isolation barrier 304 is electrically connected between the transmitter circuit 302 and the receiver circuit 306 for providing signal coupling and adequate isolation barrier. According to the embodiment of the present invention, the transmitter circuit 302 is adapted to receive a data input signal DI and operable to generate a first transmitter output signal TXO and a second transmitter output signal TXOD in response to the data input signal DI. According to the embodiment of the present invention, the second transmitter output signal TXOD is a delay signal of the first transmitter output signal TXO.

The isolation barrier 304, which is coupled with the transmitter circuit 302 is adapted to receiving both the first transmitter output signal TXO and the second transmitter output signal TXOD, such that the isolation barrier 304 is operable to develop a first isolated output signal and a second isolated output signal in response to the first transmitter output signal TXO and the second transmitter output signal TXOD respectively. According to one embodiment of the present invention, the isolation barrier 304, for example, can be composed of at least a pair of isolation capacitance or the like. And each isolation capacitance of the isolation barrier 304 is adapted to develop the first isolated output signal and the second isolated output signal respectively upon receiving the first transmitter output signal TXO and the second transmitter output signal TXOD.

As can be seen from FIG. 3, the developed first isolated output signal and second isolated output signal are the receiving signals of the receiver circuit (RX) 306, which are illustrated as the receiver input signal "RXIN" and "RXIND" respectively in the drawing.

By such configurations, the receiver circuit 306, which is coupled with the isolation barrier 304 is operable to receiving the first isolated output signal RXIN and the second isolated output signal RXIND, such that the receiver circuit 306 is operable to generate a data output signal RO in response to the first isolated output signal RXIN and the second isolated output signal RXIND.

According to a preferred embodiment of the present invention, the proposed transmitter circuit 302 of the present invention is aimed to be operable to generate the first transmitter output signal TXO in response to the data input signal DI. In addition, the second transmitter output signal TXOD is a delay signal of the first transmitter output signal TXO. In order to provide a better understanding, please refer to FIG. 4, which schematically shows a plurality of illustrated waveforms, including the data input signal DI, the first transmitter output signal TXO, the second transmitter output signal TXOD, the first isolated output signal RXIN, the second isolated output signal RXIND and the data output signal RO in accordance with the embodiment architecture in FIG. 3. In view of such waveforms, it is obvious that the second transmitter output signal TXOD is a delay signal of the first transmitter output signal TXO. For instance, by delaying the first transmitter output signal TXO by a half period of duty time (T*½) of the first transmitter output signal TXO is practicable to generate the mentioned second transmitter output signal TXOD, wherein T is a duty time of the first transmitter output signal (TXO). The applicant of the present invention will discuss later in the following paragraphs regarding how to generate the second transmitter output signal TXOD on a basis of the first transmitter output signal TXO.

An inventive and modified signal modulation technique of the present invention will be introduced first. Please refer to FIG. 5, which specifically illustrates the detailed waveforms of the first transmitter output signal TXO in view of the data input signal DI according to the embodiment of FIG. 3 in the present invention. As can be seen from the signal waveforms in FIG. 5, it should be observed that the first transmitter output signal TXO comprises a first division signal TXO_D1 and a second division signal TXO_D2, and the first transmitter output signal TXO is periodic since a voltage level of the data input signal DI should be followed by the voltage level of the first transmitter output signal TXO and the data input signal DI is periodic. On the same basis of technical principles, since the second transmitter output signal TXOD (shown in FIG. 4) is a delay signal of the first transmitter output signal TXO and the voltage level of the data input signal DI is also followed by a voltage level of the second transmitter output signal TXOD, and the data input signal DI is periodic, it is apparent that the second transmitter output signal TXOD is periodic as well.

Figure 4:
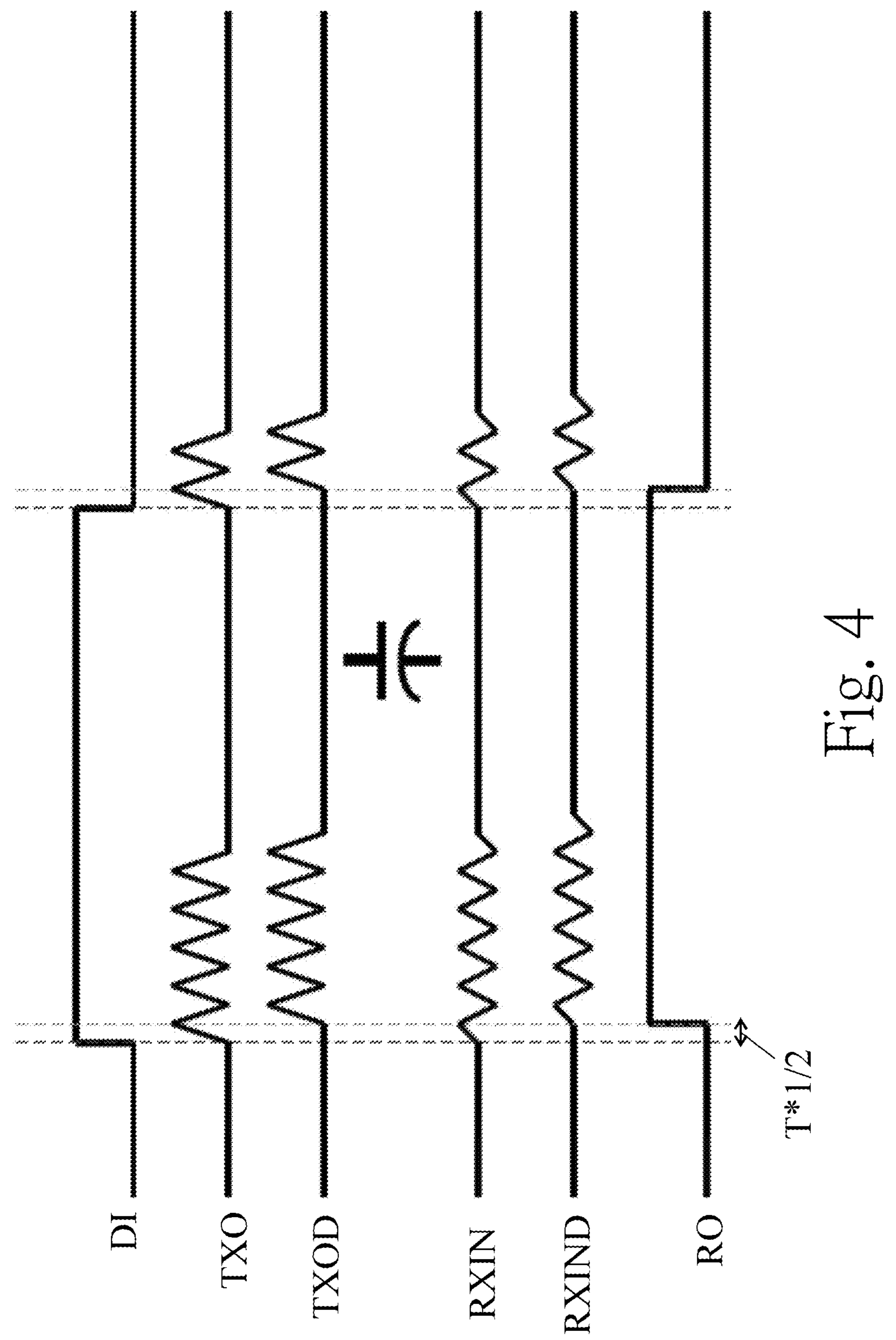
FIG. 4 schematically shows a plurality of illustrated waveforms of the data input signal DI, the first transmitter output signal TXO, the second transmitter output signal TXOD, the first isolated output signal RXIN, the second isolated output signal RXIND and the data output signal RO in accordance with the embodiment architecture in FIG. 3.
Figure 5:
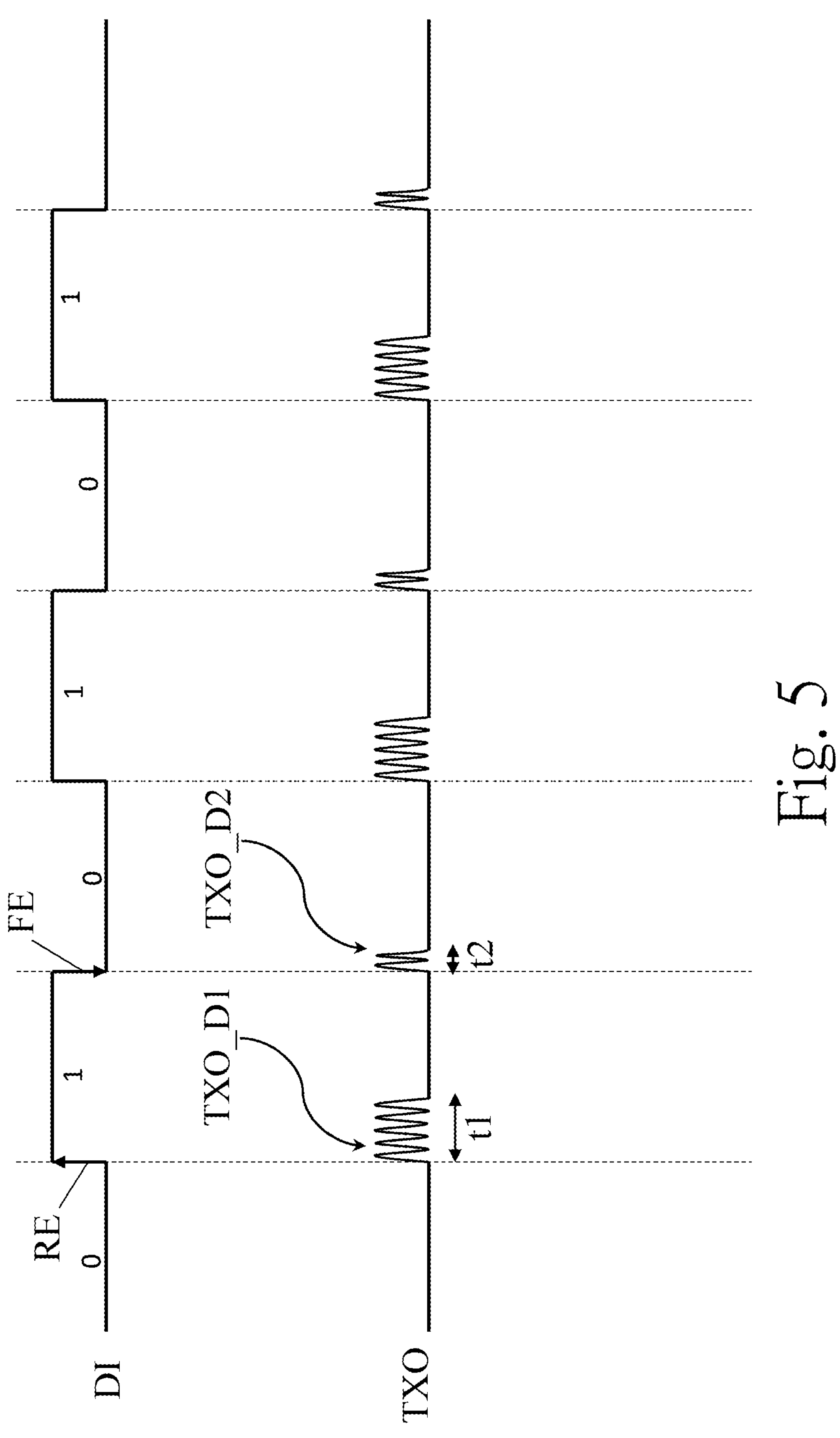
FIG. 5 specifically illustrates the detailed waveforms of the first transmitter output signal TXO in view of the data input signal DI according to the embodiment of FIG. 3 in the present invention FIG. 6 schematically shows a detailed schematic diagram of the transmitter circuit having additional delay path in accordance with the embodiment of the present invention.

Please refer to FIG. 3, FIG. 4 and FIG. 5 at the same time. According to the preferred embodiment of the present invention, the transmitter circuit 302 in FIG. 3 is operable to start to generate the first division signal TXO_D1 responsive to a first transition of the data input signal DI from a first logic state to a second logic state and terminate generating the first division signal TXO_D1 when the data input signal DI is still in the second logic state. According to one embodiment of the present invention, the first logic state is indicated by the data input signal DI at a low voltage level, as the digital level "0". And, the second logic state is indicated by the data input signal DI at a high voltage level, as the digital level "1". The first transition of the data input signal DI from the first logic state to the second logic state is referred as when the data input signal DI is turning from the digital level "0" to the digital level "1" and in response to a rising edge RE of the data input signal DI. Similarly, a second transition of the data input signal DI from the second logic state to the first logic state is referred as when the data input signal DI is turning from the digital level "1" to the digital level "0" and in response to a falling edge FE of the data input signal DI.

As can be seen, the transmitter circuit 302 in FIG. 3 is operable to start to generate the second division signal TXO_D2 responsive to the second transition of the data input signal DI from the second logic state "1" to the first logic state "0" and terminate generating the second division signal TXO_D2 when the data input signal DI is still in the first logic state "0". According to the preferred embodiment of the present invention, the first division signal TXO_D1 of the first transmitter output signal TXO comprises a first plurality of pulse carrier, and the second division signal TXO_D2 of the first transmitter output signal TXO comprises a second plurality of pulse carrier. In addition, a number of the first plurality of pulse carrier of the first division signal TXO_D1 of the first transmitter output signal TXO and that of the second plurality of pulse carrier of the second division signal TXO_D2 of the first transmitter output signal TXO are different. For instance, as shown in the embodiment in FIG. 5, the first division signal TXO_D1 of the first transmitter output signal TXO comprises more numbers of pulse carriers than the second division signal TXO_D2 of the first transmitter output signal TXO does. However, it should also be noted that the present invention is not limited thereto such configuration. According to another alternative embodiment of the present invention, then it may also be practicable for the second division signal TXO_D2 to comprise more numbers of pulse carriers than the first division signal TXO_D1. As long as the numbers of pulse carriers of the first division signal TXO_D1 and of the second division signal TXO_D2 are different, the present invention covers and claims the modifications and its equality.

To sum above, the present invention is aimed to provide a technical solution that the transmitter circuit is modified to be able to generate different number of pulse carriers respectively according to the data input signal DI turning from the digital level "0" to "1" and according to the data input signal DI turning from the digital level "1" to "0". Such signal modulation technique is referred to the proposed Pulse Carrier Modulation (PCM) technique of the present invention.

As a result, according to the pulse carrier modulation technique of the present invention, the first division signal TXO_D1 of the first transmitter output signal TXO, for instance, can be designed to have more numbers of pulse carrier than the second division signal TXO_D2 of the first transmitter output signal TXO as shown in FIG. 5 waveforms. Alternatively, the second division signal TXO_D2 of the first transmitter output signal TXO can be selectively designed to have more numbers of pulse carrier than the first division signal TXO_D1 of the first transmitter output signal TXO according to various embodiment of the present invention. The present invention is not limited thereto. Overall, it is believed that for people who are skilled in the art and having understandings and technical backgrounds to the present invention, it would be allowed for them to make various modifications or changes depending on different circuit regulations and/or specifications without departing from the scope of the invention. That is to say, the present invention is certainly not limited thereto.

In addition, according to the embodiment of the present invention, it is derived that a frequency of the first plurality of pulse carrier of the first division signal TXO_D1 of the first transmitter output signal TXO and that of the second plurality of pulse carrier of the second division signal TXO_D2 of the first transmitter output signal TXO can be variable. By adopting similar manners, an amplitude of the first plurality of pulse carrier of the first division signal TXO_D1 of the first transmitter output signal TXO and that of the second plurality of pulse carrier of the second division signal TXO_D2 of the first transmitter output signal TXO can be variable as well. The present invention is not limited thereto such details.

In another aspect, to be more specific, as referring to FIG. 5, it may also be found that the first division signal TXO_D1 of the first transmitter output signal TXO has a first operational time t1, and the first operational time t1 is a first time segment between the transmitter circuit 302 starts to generate the first plurality of pulse carrier of the first division signal TXO_D1 and to terminate generating the first plurality of pulse carrier of the first division signal TXO_D1. In addition, the second division signal TXO_D2 has a second operational time t2, and the second operational time t2 is a second time segment between the transmitter circuit 302 starts to generate the second plurality of pulse carrier of the second division signal TXO_D2 and to terminate generating the second plurality of pulse carrier of the second division signal TXO_D2. According to the embodiment of the present invention, the first operational time t1 of the first division signal TXO_D1 and the second operational time t2 of the second division signal TXO_D2 are different. By employing the pulse carrier modulation technique as disclosed earlier, the first operational time t1 of the first division signal TXO_D1, for instance, can be longer than the second operational time t2 of the second division signal TXO_D2 as shown in FIG. 5 waveforms. Alternatively, the second operational time t2 of the second division signal TXO_D2 can be selectively designed to be longer than the first operational time t1 of the first division signal TXO_D1 according to various embodiments of the present invention. The present invention is not limited thereto.

As a result, it is evident that the proposed pulse carrier modulation of the present invention achieves to be applicable to the first transmitter output signal TXO of a transmitter circuit such that the first transmitter output signal TXO of the transmitter circuit includes different number of pulse carriers in response to the rising edge and the falling edge of the data input signal DI, respectively. By employing such pulse carrier modulation (PCM) technique, the conventional On/Off Keying (OOK) modulation technique, Frequency Shift Keying (FSK) modulation technique, and Amplitude Shift Keying (ASK) modulation technique for data transmission and signal coupling can be omitted and avoided as well.

Moreover, according to the illustrated waveform of the first transmitter output signal TXO as shown in FIG. 5, it can be observed that after the transmitter circuit terminates generating the pulse carriers of the first division signal TXO_D1 or the second division signal TXO_D2, the first transmitter output signal TXO enters in a steady state. It is believed that when entering such a steady state, a voltage level of the first transmitter output signal TXO is not necessarily limited to a certain value and can be variable. By employing the design manners for avoiding generating continuous and indefinite pulse carriers during the time period when the data input signal DI is at a high voltage level (digital level="1") or at a low voltage level (digital level="0"), the present invention succeeds in reducing both power consumption and electromagnetic interferences as expected.

Figure 6:
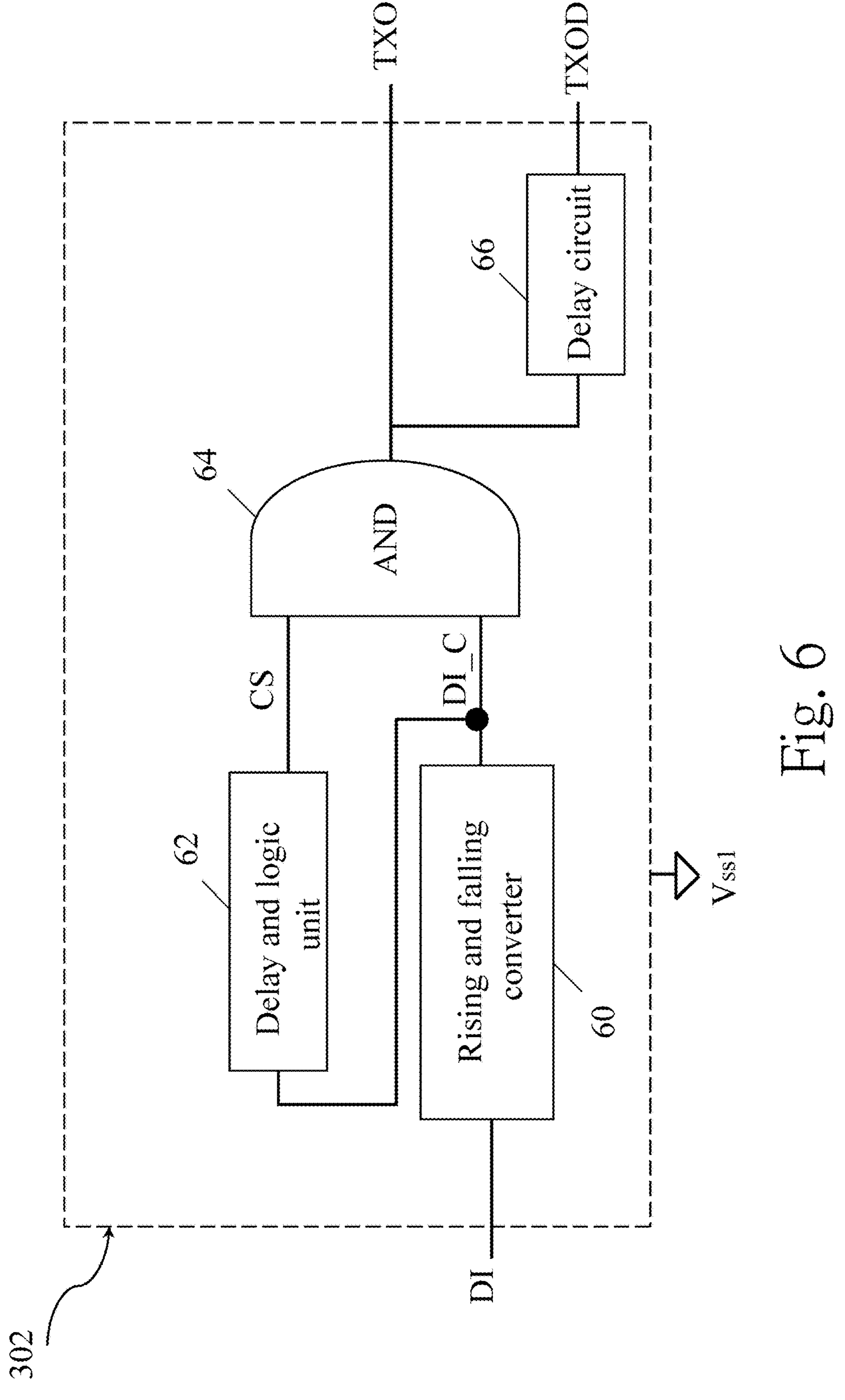

Subsequently, please refer to FIG. 6 for a detailed schematic diagram of the transmitter circuit having additional delay path in accordance with the embodiment of the present invention. As shown in FIG. 6, the proposed transmitter circuit 302 comprises a rising and falling converter 60, a delay and logic unit 62, an AND gate 64, and a delay circuit 66. The rising and falling converter 60 is adapted to receive the data input signal DI and accordingly output a converted data input signal DI_C. The delay and logic unit 62 is adapted to electrically connect with the rising and falling converter 60 for receiving the converted data input signal DI_C and accordingly generating a carrier signal CS. The AND gate 64 is electrically connected with the rising and falling converter 60 and the delay and logic unit 62 for receiving the converted data input signal DI_C and the carrier signal CS, and by employing an AND logic algorithm, outputting the first transmitter output signal TXO. According to the embodiment of the present invention, it is obvious that the input signals of the AND gate 64 are the converted data input signal DI_C from the rising and falling converter 60, and the carrier signal CS from the delay and logic unit 62. And subsequently, the delay circuit 66 is further configured as being electrically connected with the output terminal of the AND gate 64, such that by employing the configuration, the delay circuit 66 is operable to receive the first transmitter output signal TXO, delay the first transmitter output signal TXO and output the second transmitter output signal TXOD. As described earlier in the technical descriptions, since the second transmitter output signal TXOD is a delay signal of the first transmitter output signal TXO, the second transmitter output signal TXOD can be generated and obtained by delaying the first transmitter output signal TXO by a half period of duty time (T*½) of the first transmitter output signal TXO, for instance, wherein T is a duty time of the first transmitter output signal (TXO). According to the embodiment of the present invention, the corresponding waveforms of the second transmitter output signal TXOD in relation to the first transmitter output signal TXO are illustrated as in the previous drawing in FIG. 4.

Figure 7:
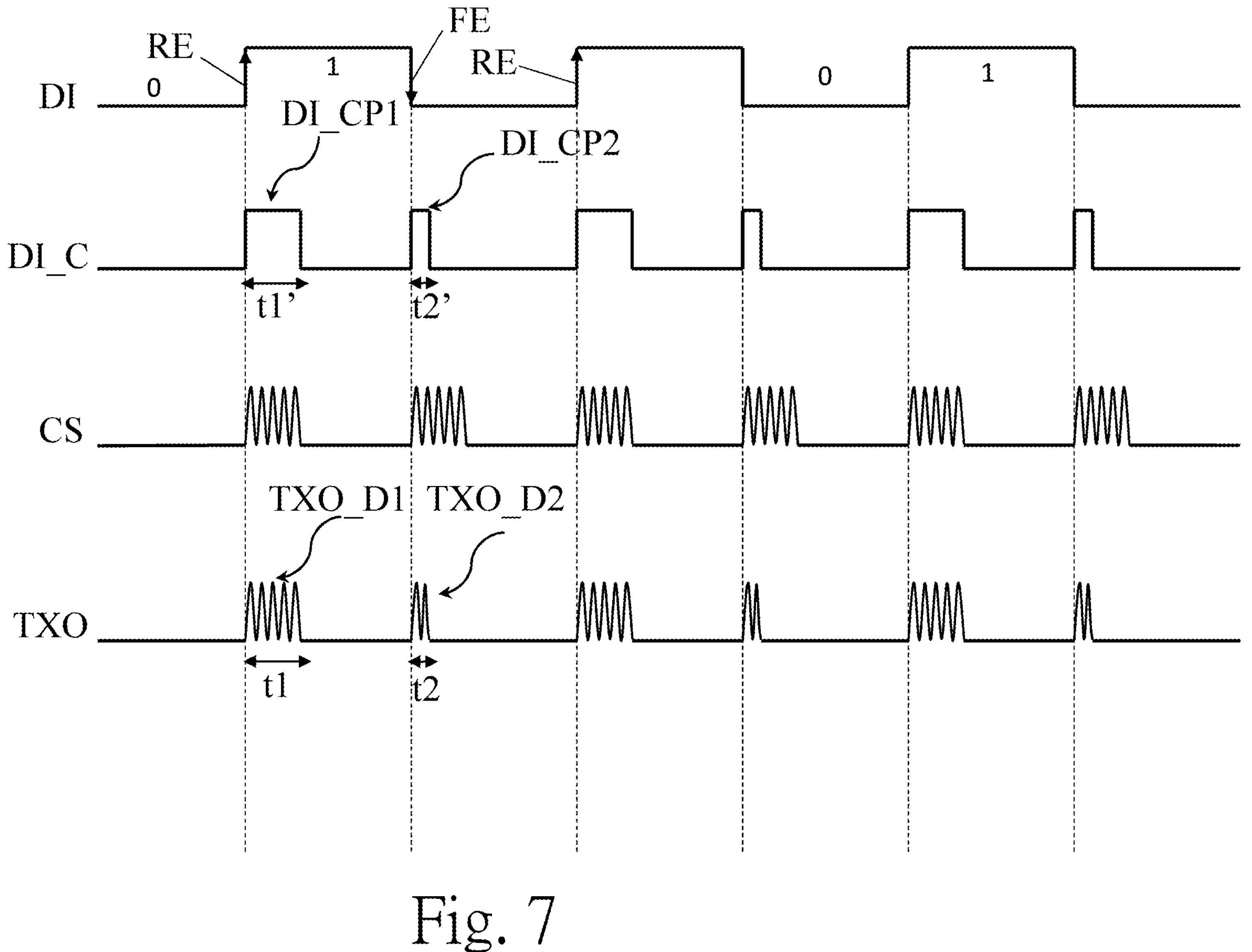
FIG. 7 specifically shows a plurality of waveforms, including the data input signal DI, the converted data input signal DI_C which is output by the rising and falling converter, the carrier signal CS which is output by the delay and logic unit, and the generated first transmitter output signal TXO which is output by the AND gate in accordance with the transmitter circuit architecture in FIG. 6.

As referring to the circuit diagram in FIG. 6, since the rising and falling converter 60 is adapted to receive the data input signal DI and accordingly output the converted data input signal DI_C, the Applicant of the present invention further provide FIG. 7, for showing the corresponding signal waveforms in accordance with the circuit diagram in FIG. 6 for better understandings. Regarding the following technical descriptions, please refer to FIG. 7, in which FIG. 7 specifically shows a plurality of waveforms, including the data input signal DI, the converted data input signal DI_C which is output by the rising and falling converter 60, the carrier signal CS which is output by the delay and logic unit 62, and the generated first transmitter output signal TXO which is output by the AND gate 64 in accordance with the transmitter circuit architecture in FIG. 6.

As we can see, the rising and falling converter 60 is adapted to receive the data input signal DI and accordingly output the converted data input signal DI_C in response to the rising edge RE and the falling edge FE of the data input signal DI. The converted data input signal DI_C comprises a first partition signal DI_CP1 and a second partition signal DI_CP2, and the converted data input signal DI_C is periodic since a voltage level of the data input signal DI should be followed by the voltage level of the converted data input signal DI_C and the data input signal DI is periodic. According to the embodiment of the present invention, the rising and falling converter 60 starts to generate the first partition signal DI_CP1 responsive to the rising edge RE of the data input signal DI and terminate generating the first partition signal DI_CP1 before the falling edge FE of the data input signal DI. And then, the rising and falling converter 60 starts to generate the second partition signal DI_CP2 responsive to the falling edge FE of the data input signal DI and terminate generating the second partition signal DI_CP2 before a next rising edge RE of the data input signal DI.

According to the preferred embodiment of the present invention, the first partition signal DI_CP1 has a first working time t1', and the first working time t1' is the time segment between the rising and falling converter 60 starts to generate the first partition signal DI_CP1 and to terminate generating the first partition signal DI_CP1. The second partition signal DI_CP2 has a second working time t2', and the second working time t2' is the time segment between the rising and falling converter 60 starts to generate the second partition signal DI_CP2 and to terminate generating second partition signal DI_CP2. In the preferred embodiment of the present invention, the first working time t1' of the first partition signal DI_CP1 of the converted data input signal DI_C and the second working time t2' of the second partition signal DI_CP2 of the converted data input signal DI_C are different.

As illustrated in FIG. 6, the delay and logic unit 62 is adapted to electrically connect with the rising and falling converter 60 and receives the converted data input signal DI_C. By such configuration, the delay and logic unit 62 generates the carrier signal CS according to the converted data input signal DI_C. Regarding the signal generation process from the receiving converted data input signal DI_C to the outputting carrier signal CS of the disclosed delay and logic unit 62, the Applicants of the present invention will provide later in the Application.

It is apparent that from the waveforms as shown in FIG. 7, the carrier signal CS comprises a plurality of pulses between the rising edge RE of the data input signal DI and the falling edge FE of the data input signal DI. And, the carrier signal CS includes fixed numbers of pulses. In other words, in the embodiment of the present invention, a number of the plurality of pulses of the carrier signal CS is limited and definite.

After that, since the AND gate 64 is electrically connected with the rising and falling converter 60 and the delay and logic unit 62 and receives the converted data input signal DI_C and the carrier signal CS as the inputs of the AND gate 64, the first transmitter output signal TXO is generated at the output of the AND gate 64, based on the converted data input signal DI_C and the carrier signal CS by employing the AND logic algorithm. It is worth noticing that, due to the AND logic algorithm of the AND gate 64, the first operational time t1 of the first division signal TXO_D1 of the first transmitter output signal TXO will be determined as equal to the first working time t1' of the first partition signal DI_CP1 of the converted data input signal DI_C, and the second operational time t2 of the second division signal TXO_D2 of the first transmitter output signal TXO will be determined as equal to the second working time t2' of the second partition signal DI_CP2 of the converted data input signal DI_C.

Figure 8:
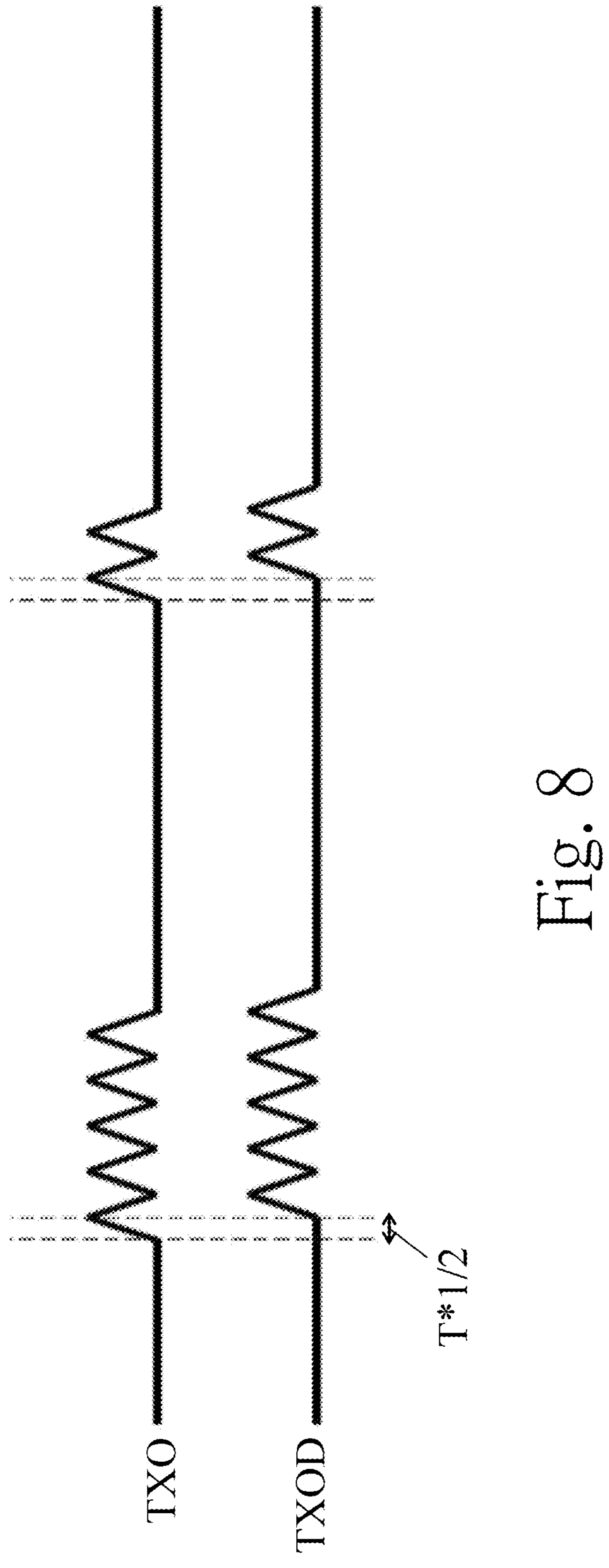
FIG. 8 schematically shows the corresponding waveforms of the second transmitter output signal TXOD in relation to the first transmitter output signal TXO according to the embodiment of the present invention.

After obtaining the first transmitter output signal TXO from the output terminal of the AND gate 64, the delay circuit 66 which is electrically connected with the AND gate 64 is operable to receive the first transmitter output signal TXO, delay the first transmitter output signal TXO and output the second transmitter output signal TXOD. Please refer to FIG. 8 for the corresponding waveforms of the second transmitter output signal TXOD in relation to the first transmitter output signal TXO according to the embodiment of the present invention. By employing the delay circuit 66 as being disposed in the transmitter circuit 302, it is believed that the second transmitter output signal TXOD can be obtained by delaying the first transmitter output signal TXO by a half period of duty time (T*½) of the first transmitter output signal TXO, for instance. And the parameter "T" can be referred as a duty time of the first transmitter output signal TXO.

Figure 9:
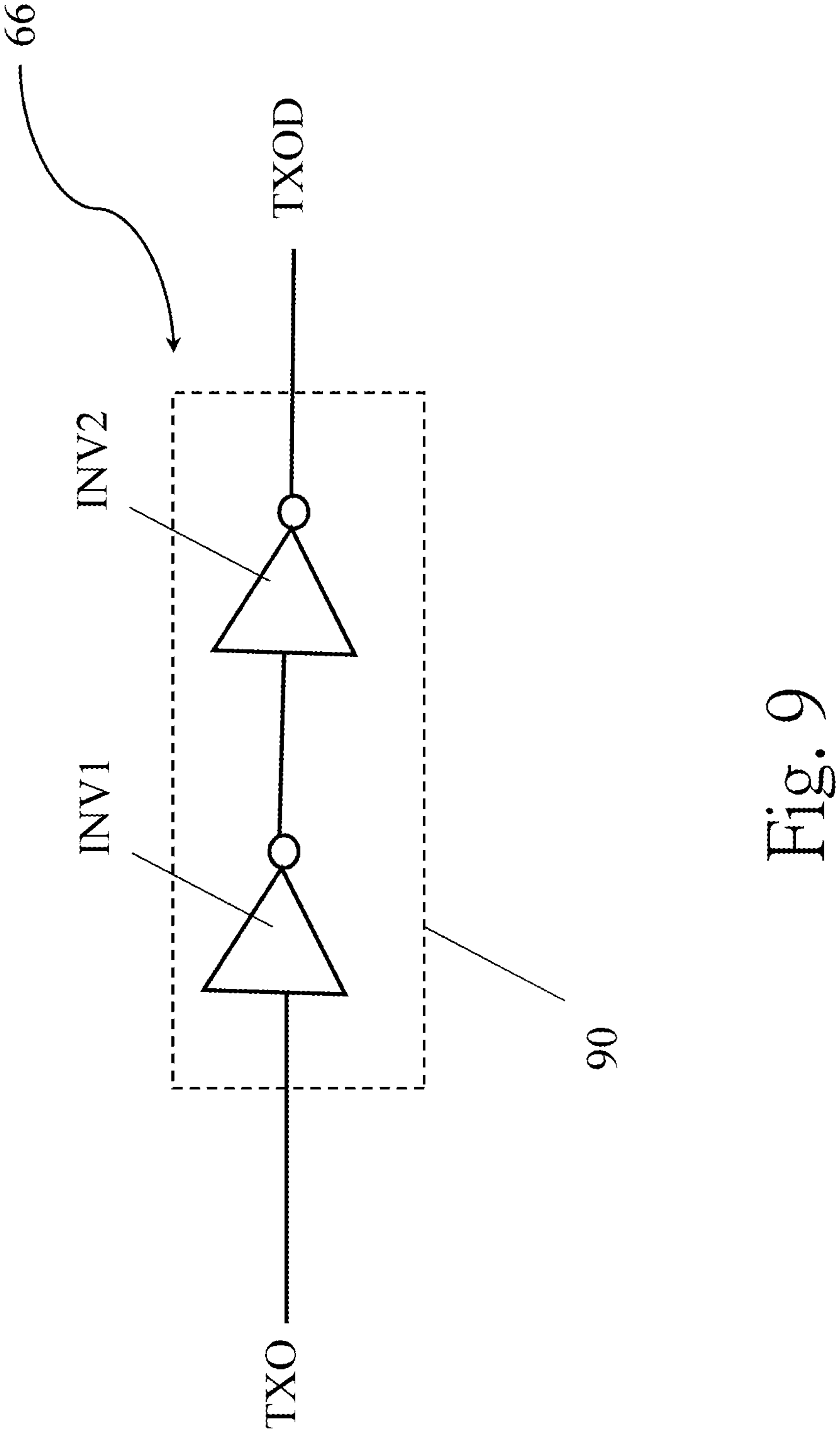
FIG. 9 schematically shows a detailed layout configuration of the disclosed delay circuit in accordance with the embodiment of the present invention according to FIG. 6.

In the following technical descriptions, for a detailed layout configuration of the disclosed delay circuit 66 of the embodiment of the present invention, please refer to FIG. 9, in which FIG. 9 schematically shows a detailed layout configuration of the disclosed delay circuit 66 in accordance with the embodiment of the present invention according to FIG. 6. As referring to FIG. 9, it is illustrated that the disclosed delay circuit 66 comprises at least one inverting unit 90, and the inverting unit 90 is forming by electrically connecting two inverters INV1, INV2 in series, such that the inverting unit 90 is operable to receive the first transmitter output signal TXO, delay the first transmitter output signal TXO and accordingly output the second transmitter output signal TXOD.

Figure 10:
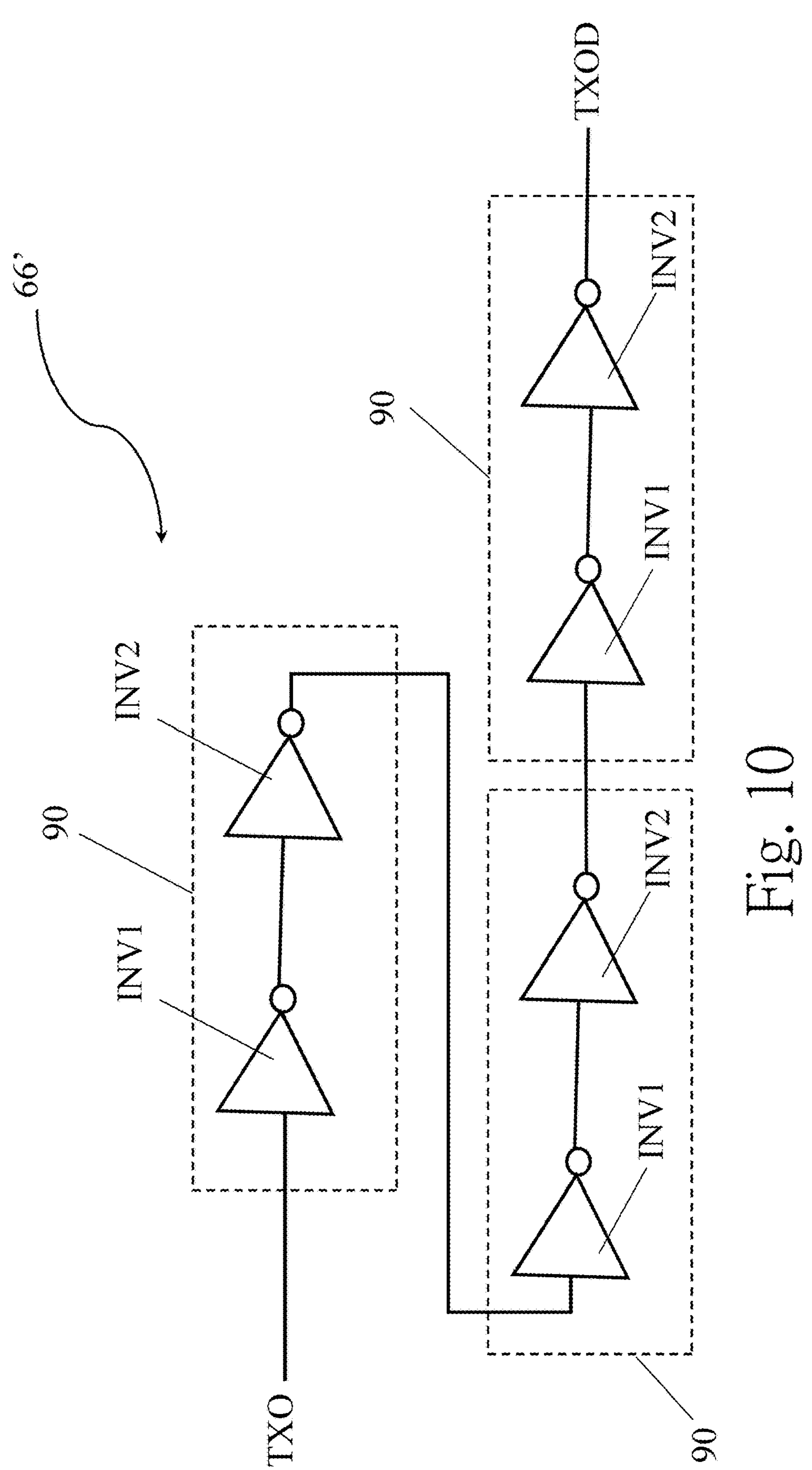
FIG. 10 schematically shows another alternative detailed layout configuration of the disclosed delay circuit comprising a plurality of inverting units electrically connected in cascade in accordance with the embodiment of the present invention according to FIG. 6.

However, the present invention is not limited to such configurations. Please refer to FIG. 10, which schematically shows another alternative detailed layout configuration of the disclosed delay circuit in accordance with the embodiment of the present invention according to FIG. 6. As can be seen in FIG. 10, then the proposed alternative delay circuit 66' may alternatively comprise a plurality of inverting units 90. In this embodiment, the disclosed delay circuit 66' is formed by serially connecting three inverting units 90 in cascade. And by employing the plurality of the inverting units 90 which are electrically connected in cascade, the formed delay circuit 66' is also operable for receiving the first transmitter output signal TXO, delaying the first transmitter output signal TXO and accordingly outputting the second transmitter output signal TXOD. As a result, it is believed that several alternative variations and embodiments may also be achieved by people who are skilled in the art and having ordinary skills of the art. For instance, the number of serially connected inverting units 90 can be any positive integer, which is greater than 1. And the present invention is not limited to serially connecting three inverting units 90 in cascade as the embodiment shown in FIG. 10. In general, the present invention covers the modifications, and its equality based on the disclosed technical contents of the present invention regardless of the number of inverting units and/or inverters used in the circuit layout configuration of the delay circuit. And such embodiments are still applicable to implement the objectives of the present invention in order to generate and provide a delayed transmitter output signal (i.e. the second transmitter output signal TXOD) on the basis of an original transmitter output signal (i.e. the first transmitter output signal TXO).

Figure 11:
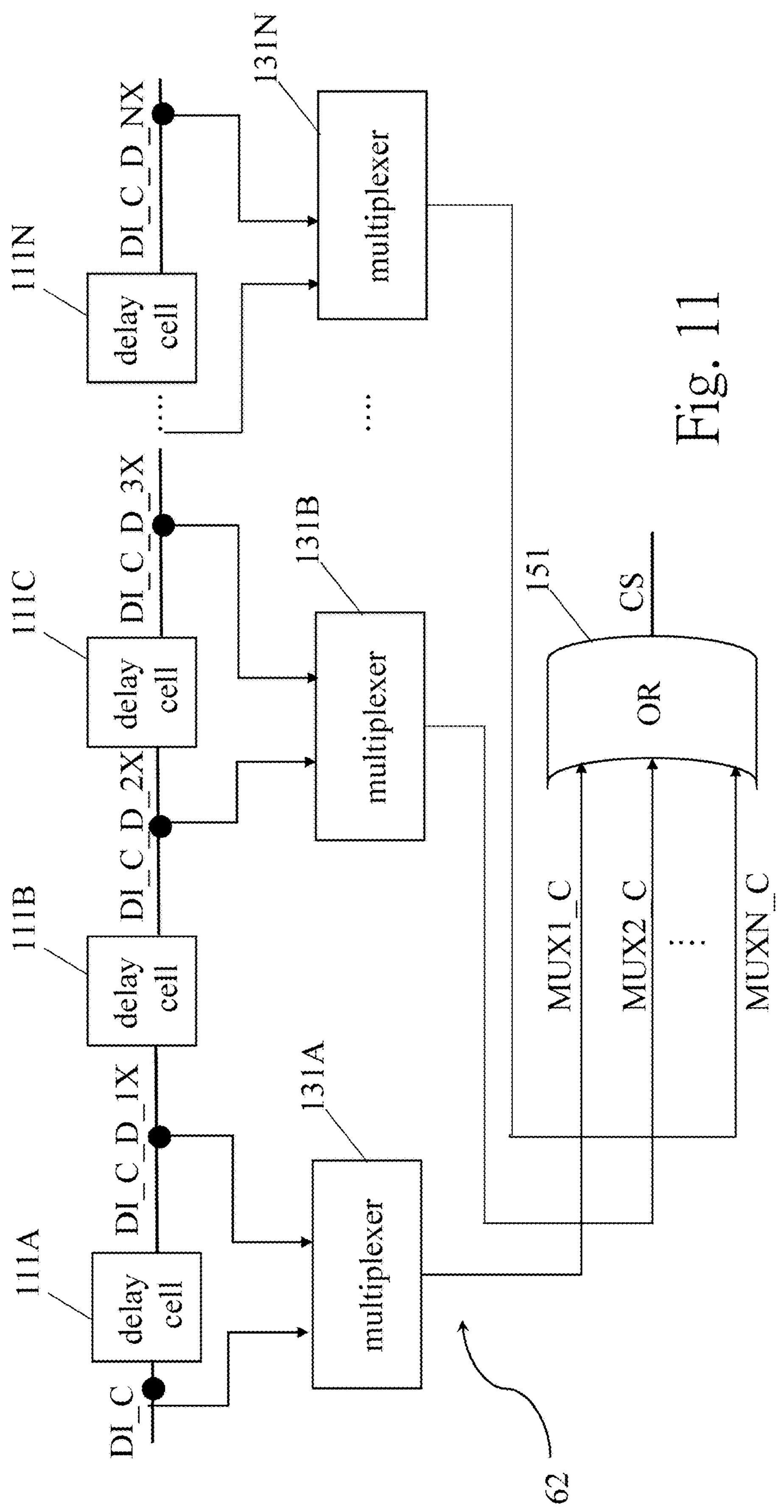
FIG. 11 schematically shows a detailed circuit diagram of the delay and logic unit in accordance with the embodiment of the present invention.

In the following technical descriptions, for considering the signal generation process of the disclosed delay and logic unit 62 in FIG. 6 upon receiving the converted data input signal DI_C from the rising and falling converter 60 so as to generate the outputting carrier signal CS, please refer to FIG. 11, in which FIG. 11 discloses a detailed circuit diagram of the delay and logic unit in accordance with the embodiment of the present invention. As can be seen in FIG. 11, the delay and logic unit 62 comprises multiple delay cells 111A, 111B, 111C . . . 111N, multiple multiplexers 131A, 131B . . . 131N, and an OR gate 151.

The multiple delay cells 111A, 111B, 111C . . . 111N are connected in series to receive the converted data input signal DI_C, delay the converted data input signal DI_C sequentially and output multiple delayed signals DI_C_D_1X, DI_C_D_2X, DI_C_D_3X . . . DI_C_D_NX. According to the embodiment of the present invention, a signal delay time of each of the multiple delay cells 111A, 111B, 111C . . . 111N is one period "X". As a result, the first delay cell 111A receives the converted data input signal DI_C, delay the converted data input signal DI_C by one period "X" and outputs a first delayed signal DI_C_D_1X. The second delay cell 111B receives the first delayed signal DI_C_D_1X, delay the first delayed signal DI_C_D_1X by one period "X" and outputs a second delayed signal DI_C_D_2X. The third delay cell 111C receives the second delayed signal DI_C_D_2X, delay the second delayed signal DI_C_D_2X by one period "X" and outputs a third delayed signal DI_C_D_3X, and so on.

Each of the multiple multiplexers 131A, 131B . . . 131N includes two input ends and an output end, wherein the two input ends are electrically connected to successive two of the converted data input signal and the multiple delayed signals to accordingly generate a multiplexer signal at the output end. For example, the two input ends of the multiplexer 131A are electrically connected to the converted data input signal DI_C and the first delayed signal DI_C_D_1X to accordingly generate a first multiplexer signal MUX1_C at its output end.

In addition, the two input ends of the multiplexer 131B are electrically connected to the second delayed signal DI_C_D_2X and the third delayed signal DI_C_D_3X to accordingly generate a second multiplexer signal MUX2_C at its output end. The similar electrically connection manners can be therefore applied to the rest of the multiple multiplexers, and the Applicant of the present invention spare the same descriptions hereinafter.

Figure 12:
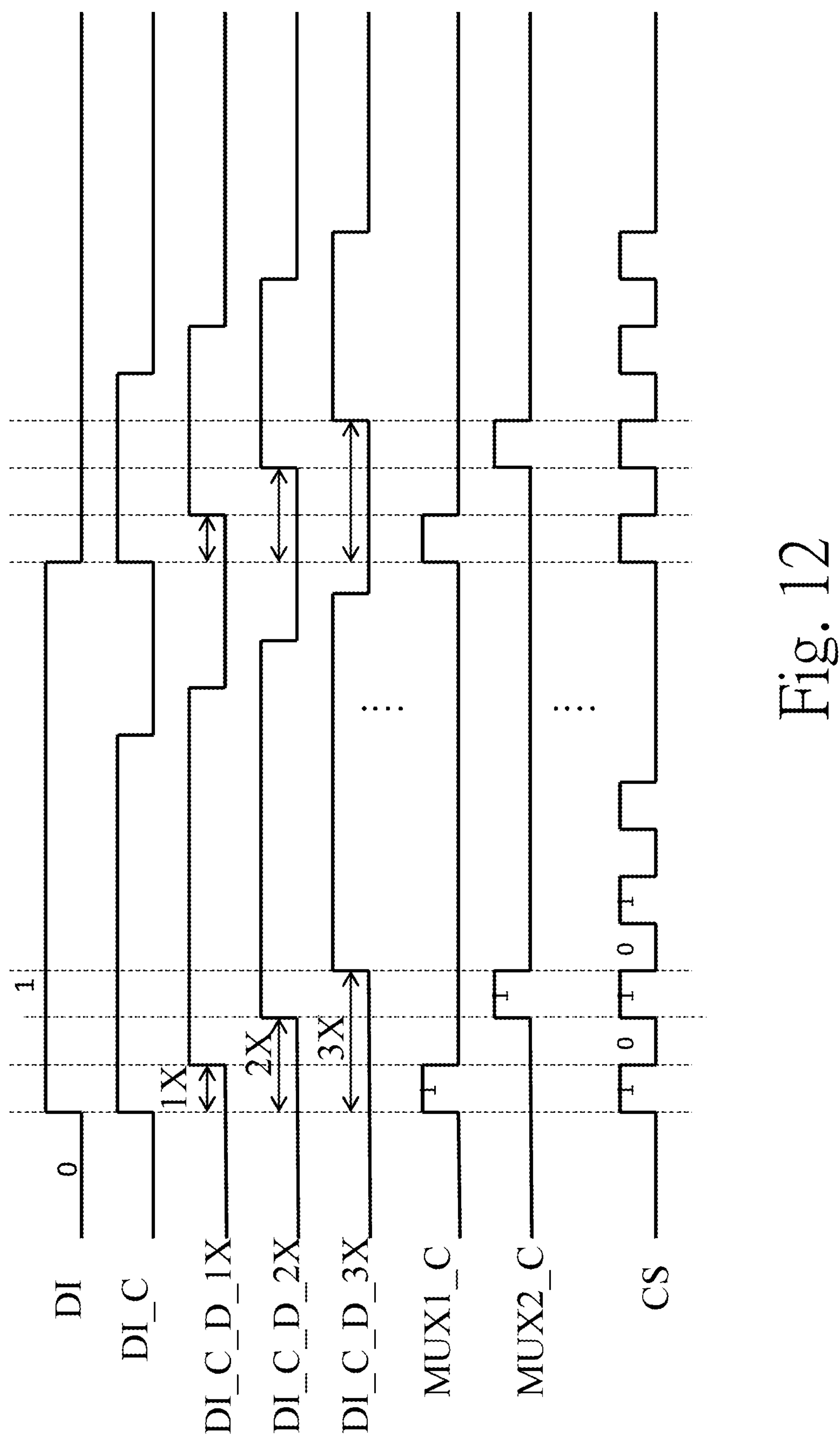
FIG. 12 shows a plurality of illustrated waveforms of the nodes as indicated in FIG. 11.

In details, to be more precise, please refer to FIG. 12 for the multiplexer signal waveforms, in which FIG. 12 shows a plurality of illustrated waveforms of the nodes as indicated in FIG. 11. As can be seen, according to the embodiment of the present invention, the multiplexer signal is operable to turn to a high voltage level (logically "1") when a former one of the successive two of the converted data input signal DI_C and the multiple delayed signals DI_C_D_1X, DI_C_D_2X, DI_C_D_3X . . . is at the high voltage level and a later one of the successive two of the converted data input signal DI_C and the multiple delayed signals DI_C_D_1X, DI_C_D_2X, DI_C_D_3X is at a low voltage level. As a result, the generated multiplexer signals MUX1_C, MUX2_C . . . can be obtained as shown in the FIG. 12 waveforms.

For instance, the first multiplexer signal MUX1_C is at a high voltage level (logically "1") when the converted data input signal DI_C is at the high voltage level (logically "1") and the delayed signal DI_C_D_1X is at a low voltage level (logically "0"). And, the second multiplexer signal MUX2_C is at a high voltage level (logically "1") when the delayed signal DI_C_D_2X is at the high voltage level (logically "1") and the delayed signal DI_C_D_3X is at a low voltage level (logically "0").

And after that, the OR gate 151 is adapted to receive a plurality of the multiplexer signal MUX1_C, MUX2_C . . . MUXN_C from the output end of the multiple multiplexers 131A, 131B . . . 131N, so as to generate the carrier signal CS. From the illustrated waveforms as shown in FIG. 12, it is proven that the generated carrier signal CS comprises a plurality of pulses, and a number of the plurality of pulses of the carrier signal CS is limited and definite. As such, by employing the delay and logic unit 62 configurations as disclosed in FIG. 11, it is believed that the carrier signal CS having limited and definite pulses is generated to successfully replace the conventional oscillator giving continuous and indefinite pulses. And therefore, it is believed that the present invention performs to effectively solve the enormous power consumption and severe electromagnetic interference issues in the prior arts. And additionally, data output signals can be maintained precisely and avoid jitter problems at the same time.

In other words, according to the technical solution of the present invention in view of the circuit design of the disclosed delay and logic unit 62, the traditional oscillator used in the transmitter circuit structure can be effectively replaced and omitted. As such, it is verified that, by employing the inventive and novel circuit layout configuration of the disclosed transmitter circuit (TX) structure of the present invention, the proposed transmitter circuit (TX) structure comprises a rising and falling converter, a delay and logic unit, an AND gate and a delay circuit to successfully replace the conventional oscillator to be used in the prior arts. As a result, based on at least one embodiment provided above, it is believed that the proposed transmitter circuit of the present invention has been characterized and by adopting the above disclosed design rules, the disclosed transmitter circuit is operable to generate its transmitter output signal (TXO) in response to the data input signal (DI), depending on a rising edge and a falling edge of the data input signal (DI). Under such circumstances, the conventional oscillator configuration is spared, and as such, by employing the proposed circuit diagram, the present invention is believed as beneficial to reducing power consumption and electromagnetic interferences and meanwhile assuring data transmission accuracy and robustness of the system output voltages.

Figure 13:
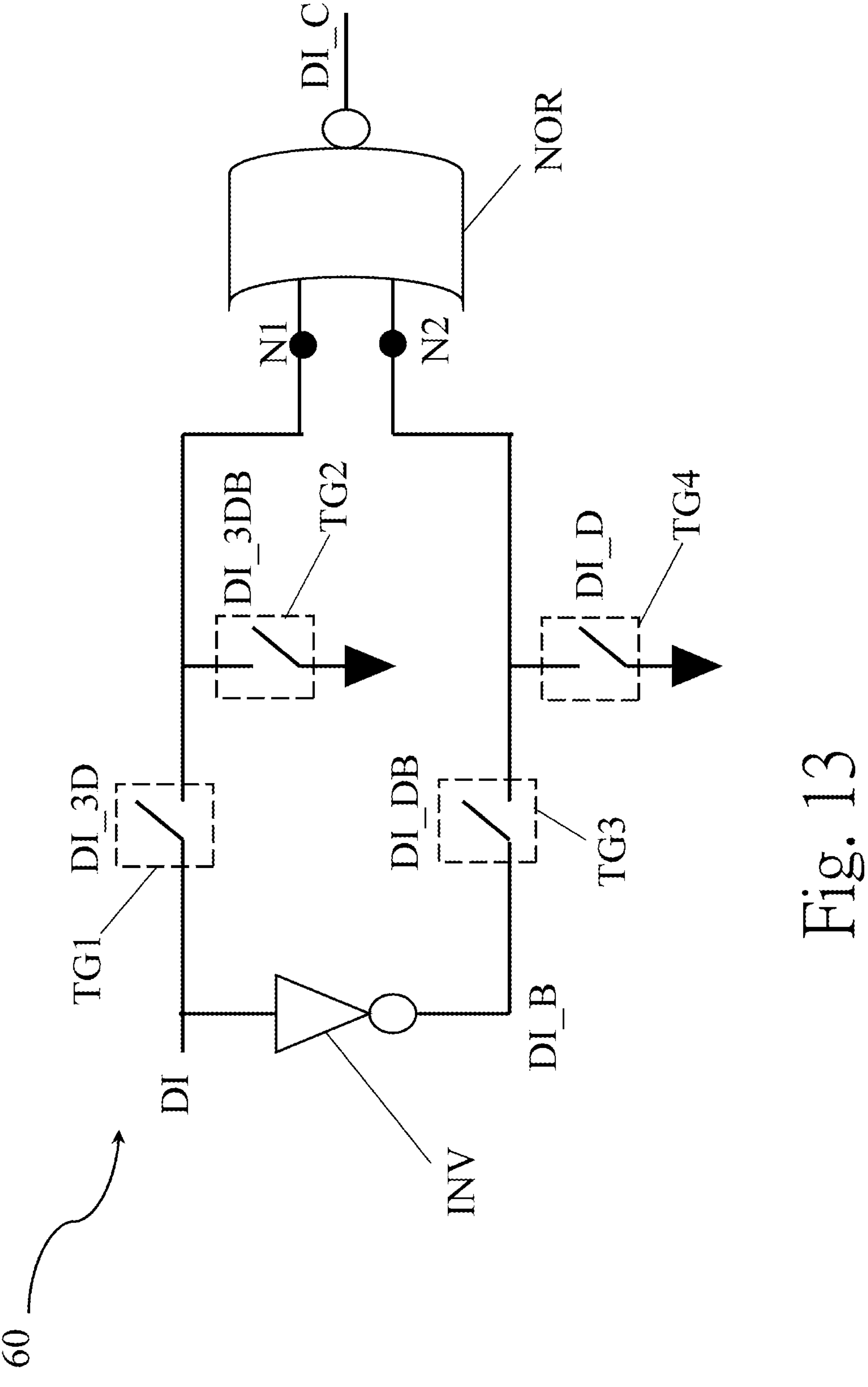
FIG. 13 schematically shows a detailed circuit diagram of the disclosed rising and falling converter in accordance with a first feasible embodiment of the present invention.
Figure 14:
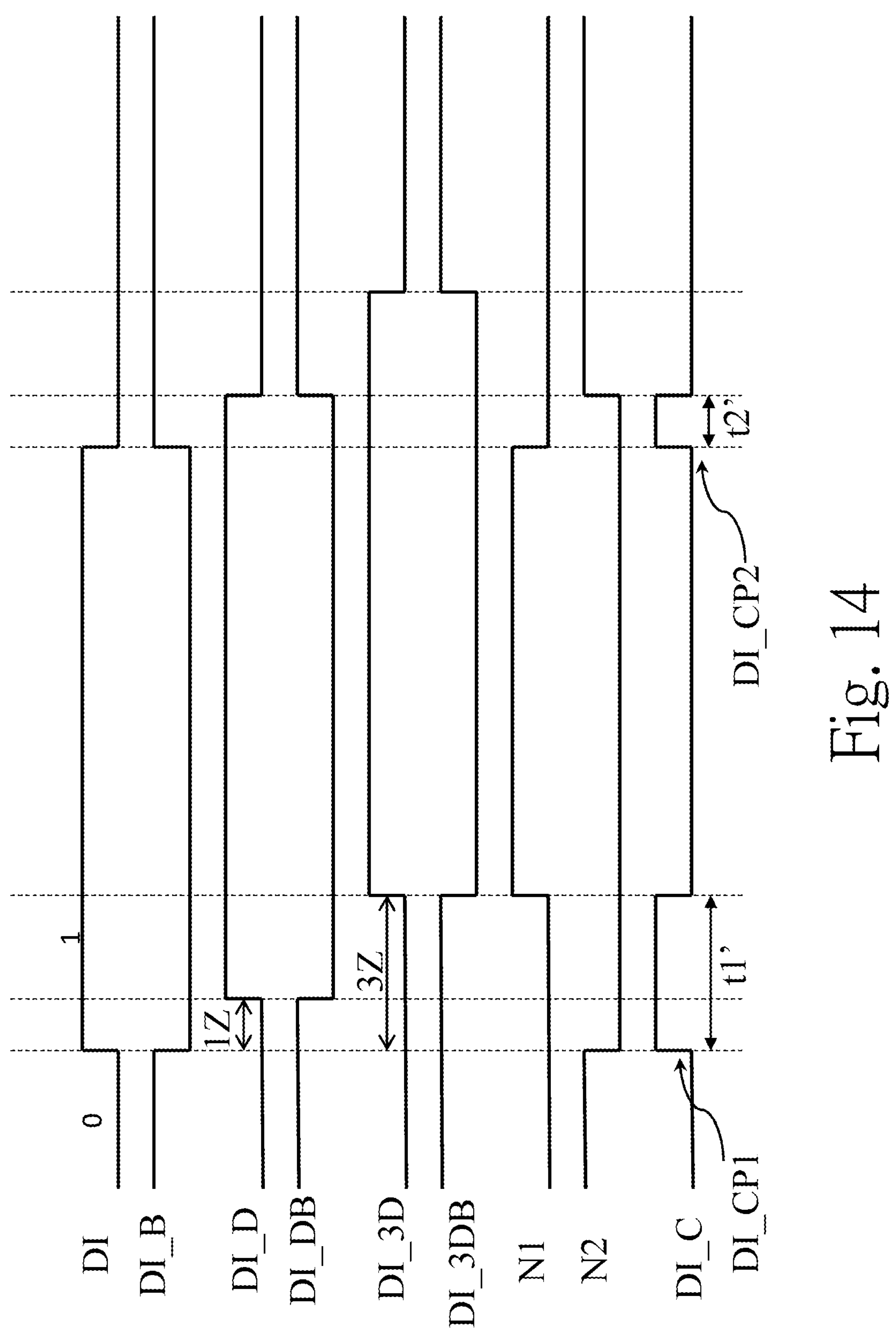
FIG. 14 accordingly shows a plurality of the illustrated waveforms of the nodes as indicated in the circuit embodiment in FIG. 13.

In another aspect, please refer to FIG. 13, which schematically shows a detailed circuit diagram of the disclosed rising and falling converter in accordance with a first feasible embodiment of the present invention. And FIG. 14 shows a plurality of the illustrated waveforms of the nodes as indicated in the circuit embodiment in FIG. 13. Please refer to FIG. 13 and FIG. 14 at the same time for the following technical descriptions. It is shown that the rising and falling converter 60 in the first feasible embodiment may include an inverter INV, a first transmission gate TG1, a second transmission gate TG2, a third transmission gate TG3, a fourth transmission gate TG4 and an NOR gate NOR. The inverter INV receives the data input signal DI and outputs an inverted data input signal DI_B. The input (DI) and the output (DI_B) of the inverter INV are respectively connected with the first transmission gate TG1 and the third transmission gate TG3. The data input signal DI is delayed by a first period 3Z to form the signal as illustrated as "DI_3D", and the data input signal DI is delayed by a second period 1Z to form the signal as illustrated as "DI_D" according to the first embodiment of the rising and falling converter of the present invention. In such a first embodiment of the rising and falling converter 60, the first period 3Z is longer than the second period 1Z. And, the delayed signal "DI_3D", which is formed by delaying the data input signal DI by the first period 3Z, is generated to control the first transmission gate TG1. And, the delayed signal "DI_D", which is formed by delaying the data input signal DI by the second period 1Z, is generated to control the fourth transmission gate TG4.

In a similar methodology, the inverted data input signal DI_B is delayed by the first period 3Z and the second period 1Z, respectively to form the delayed signal "DI_3DB" and "DI_DB". And, the delayed signal "DI_3DB" and "DI_DB" are respectively generated to control the second transmission gate TG2 and the third transmission gate TG3. A first input end N1 of the NOR gate NOR is electrically connected with the first transmission gate TG1 and the second transmission gate TG2, and a second input end N2 of the NOR gate NOR is electrically connected with the third transmission gate TG3 and the fourth transmission gate TG4. According to the embodiment of the present invention, when the control signal of the foregoing transmission gates TG1, TG2, TG3 and TG4 is at a high voltage level (digital level="1"), the transmission gates TG1, TG2, TG3 and TG4 are connected. Otherwise, if the control signal of the foregoing transmission gates TG1, TG2, TG3 and TG4 is at a low voltage level (digital level="0"), the transmission gates TG1, TG2, TG3 and TG4 are open. As a result, it is observed that the waveforms of the first input end N1 and the second input end N2 are obtained as shown in FIG. 14. And, the NOR gate NOR outputs the converted data input signal DI_C as shown in FIG. 14 waveform according to the waveforms of the first input end N1 and the second input end N2. In such a first embodiment of the rising and falling converter, the first period 3Z is longer than the second period 1Z, resulting in the first working time t1' of the first partition signal DI_CP1 of the converted data input signal DI_C being longer than the second working time t2' of the second partition signal DI_CP2 of the converted data input signal DI_C.

Figure 15:
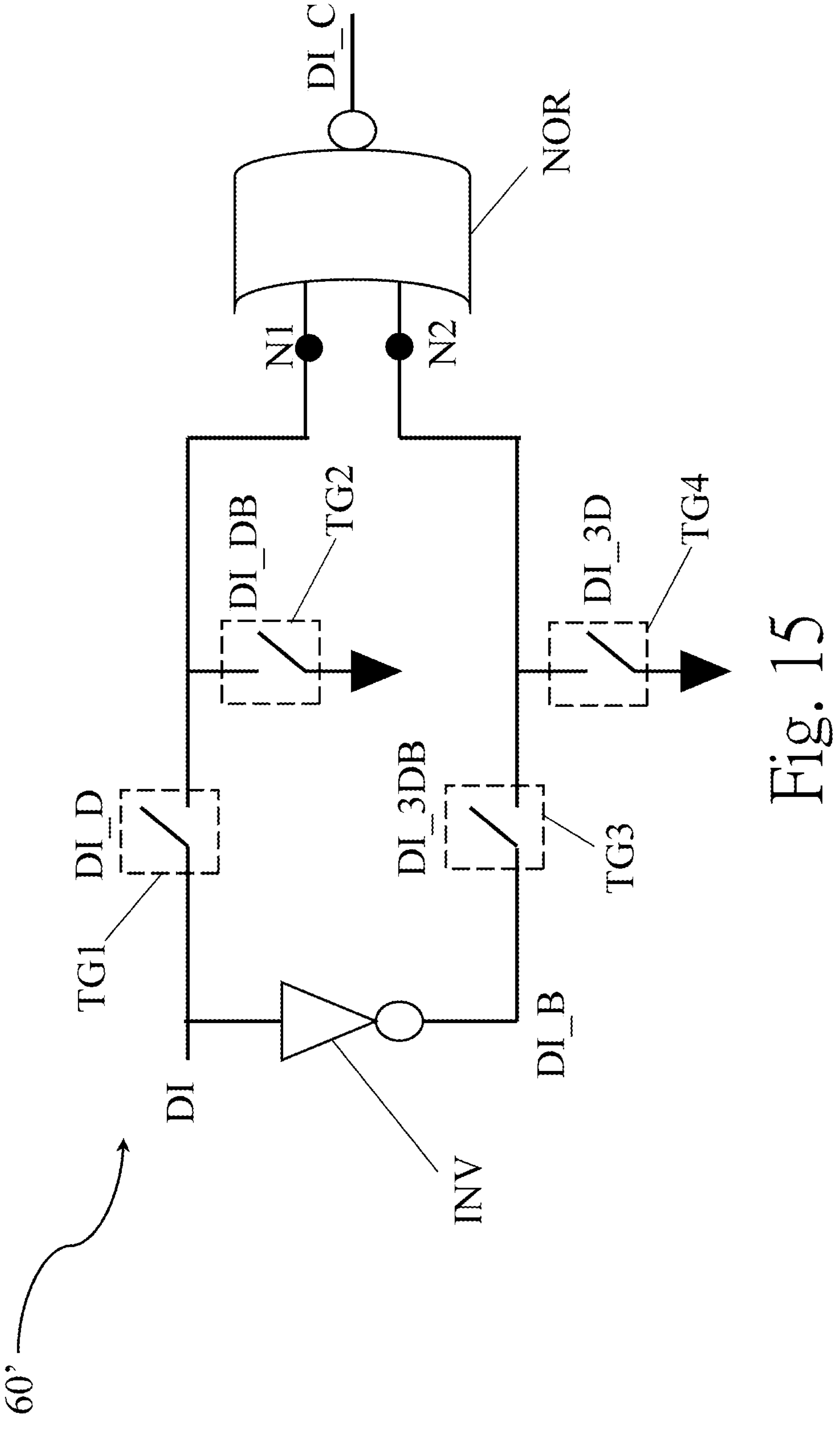
FIG. 15 additionally shows another detailed circuit diagram of the disclosed rising and falling converter in accordance with a second feasible embodiment of the present invention.
Figure 16:
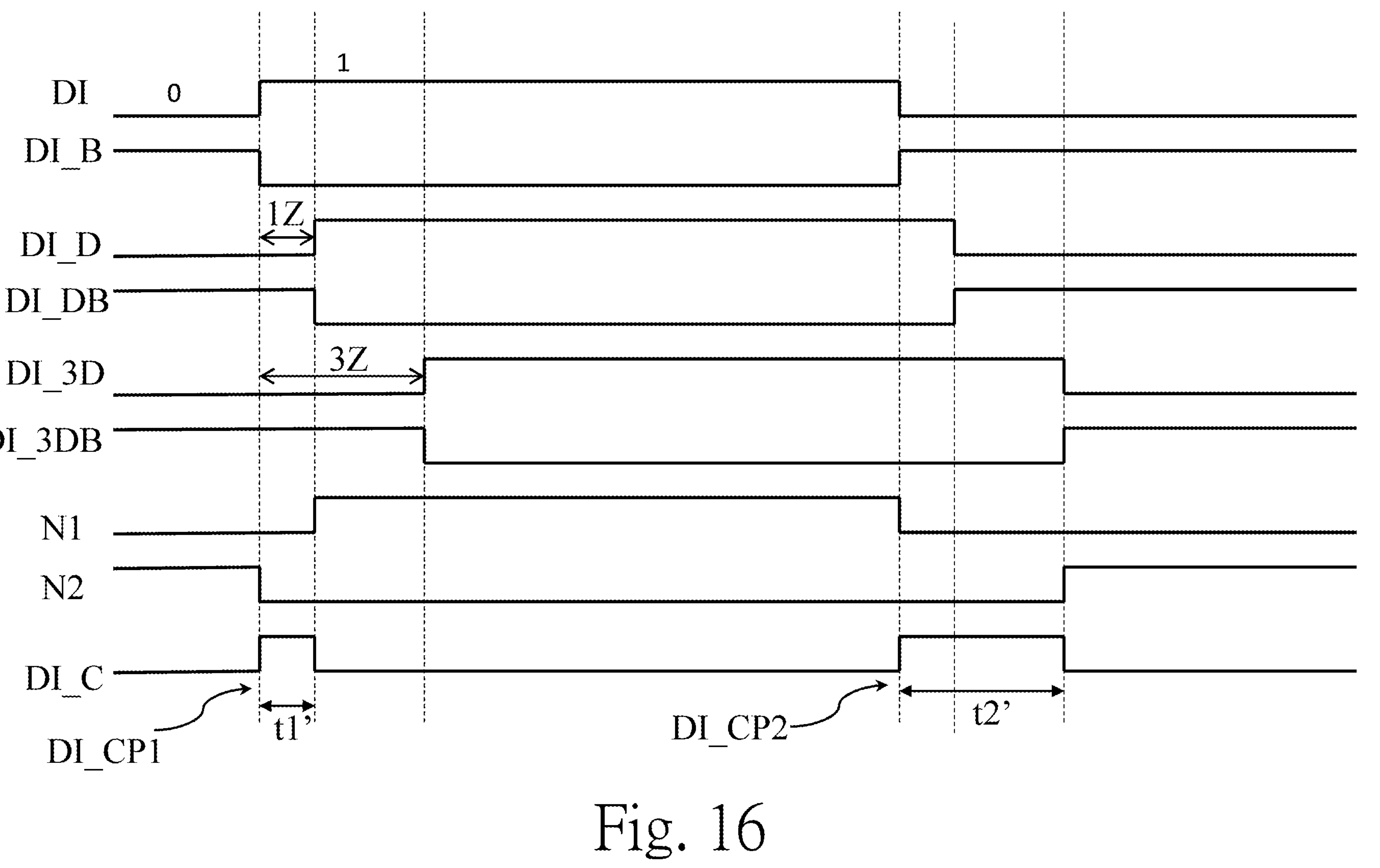
FIG. 16 accordingly shows a plurality of the illustrated waveforms of the nodes as indicated in the circuit embodiment in FIG. 15.

And furthermore, FIG. 15 additionally shows another detailed circuit diagram of the disclosed rising and falling converter in accordance with a second feasible embodiment of the present invention. And FIG. 16 accordingly shows a plurality of the illustrated waveforms of the nodes as indicated in the circuit embodiment in FIG. 15. Please refer to FIG. 15 and FIG. 16 at the same time for the following technical descriptions. It is shown that the rising and falling converter 60' may also include the inverter INV, the first transmission gate TG1, the second transmission gate TG2, the third transmission gate TG3, the fourth transmission gate TG4 and the NOR gate NOR. The inverter INV receives the data input signal DI and outputs an inverted data input signal DI_B. A first input end N1 of the NOR gate NOR is electrically connected with the first transmission gate TG1 and the second transmission gate TG2, and a second input end N2 of the NOR gate NOR is electrically connected with the third transmission gate TG3 and the fourth transmission gate TG4. The NOR gate NOR outputs the converted data input signal DI_C as shown in FIG. 16 waveform according to the waveforms of the first input end N1 and the second input end N2. As we compare the second embodiment of the rising and falling converter 60' with the previous first embodiment of the rising and falling converter 60 (shown in FIG. 13 and FIG. 14), it can be observed that the first period used in the second embodiment for delaying the data input signal DI and the inverted data input signal DI_B is 1Z, and the second period used for delaying the data input signal DI and the inverted data input signal DI_B is 3Z. As such, according to the second embodiment, the control signals of the first transmission gate TG1 and the fourth transmission gate TG4 are the delayed signal "DI_D" and "DI_3D", respectively. The control signals of the second transmission gate TG2 and the third transmission gate TG3 are the delayed signal "DI_DB" and "DI_3DB", respectively.

In such a second embodiment of the rising and falling converter 60', the second period 3Z is longer than the first period 1Z, resulting in the second working time t2' of the second partition signal DI_CP2 of the converted data input signal DI_C being longer than the first working time t1' of the first partition signal DI_CP1 of the converted data input signal DI_C, as shown in the waveform of the converted data input signal DI_C in FIG. 16.

And therefore, based on the above mentioned embodiments as disclosed in FIG. 13 and FIG. 14 as well as in FIG. 15 and FIG. 16, it is apparent that the present invention achieves to sophisticatedly design the rising and falling converter so as to make the first working time t1' of the first partition signal DI_CP1 of the converted data input signal DI_C and the second working time t2' of the second partition signal DI_CP2 of the converted data input signal DI_C are different. It does not matter whether the first working time t1' of the first partition signal DI_CP1 is longer than the second working time t2' of the second partition signal DI_CP2, or the second working time t2' of the second partition signal DI_CP2 is longer than the first working time t1' of the first partition signal DI_CP1. As long as the first working time t1' of the first partition signal DI_CP1 and the second working time t2' of the second partition signal DI_CP2 are different, resulting in the first operational time t1 of the first division signal TXO_D1 of the first transmitter output signal TXO and the second operational time t2 of the second division signal TXO_D2 of the first transmitter output signal TXO are different, the present invention achieves to design a number of the first plurality of pulse carrier of the first division signal TXO_D1 differs from that of the second plurality of pulse carrier of the second division signal TXO_D2. And since the transmitter output signal of the transmitter circuit (TXO_D1, TXO_D2) are designed to comprise different number of pulse carriers in response to the rising edge and the falling edge of the data input signal DI, respectively, the present invention achieves to invent a novel pulse carrier modulation (PCM) technique for the digital isolator module. Such pulse carrier modulation (PCM) technique disclosed by the present invention is effective so as to avoid additional data communication channel for signal coupling. In addition, compared with the prior arts when the transmitter circuit continued to output continuous and indefinite pulse carriers as the data input signal is high (or even low), the present invention is effective and beneficial to reduce power consumption and electromagnetic interferences due to a reduced number of pulse carriers of its transmitter output signal (both in the first transmitter output signal TXO and the second transmitter output signal TXOD).

Therefore, based on the at least one embodiment provided above, it is believed that the proposed digital isolator module of the present invention is characterized by utilizing a novel pulse carrier modulation technique. By employing the proposed pulse carrier modulation to a transmitter circuit, the transmitter circuit is operable to generate different number of pulse carriers respectively responsive to a rising edge and a falling edge of the data input signal. And since the transmitter circuit is adapted to output a first plurality of pulse carrier when the data input signal transitions from a digital level "0" to "1" and output a second plurality of pulse carrier when the data input signal transitions from a digital level "1" to "0", it is easily derived that a number of the first plurality of pulse carrier and that of the second plurality of pulse carrier are different. And as such, it is believed that the present invention is believed as beneficial to reducing IC power consumption and electromagnetic interferences. Meanwhile, by utilizing the proposed digital isolator module with pulse carrier modulation, the present invention assures data transmission accuracy and robustness of the system output voltages without the jitter disturbances.

And in addition, since the proposed digital isolator module of the present invention is also characterized by having another delay path for generating a delayed transmitter output signal (i.e. the second transmitter output signal TXOD) based on an original transmitter output signal (i.e. the first transmitter output signal TXO), it is believed that the present invention is also advantageous of enhancing the signal at the receiver input terminal by at least two times. And due to such benefits, the robustness of data transmission of the disclosed digital isolator module of the present invention can be significantly improved and the common mode voltage instability can be suppressed at the same time. In addition, data output signals can be maintained accurately, and jitter disturbances can be avoided effectively. The present invention is aimed to additionally solve the enormous power consumption and severe electromagnetic interference issues in the prior arts.

On account of all, as can be obtained from the embodiments of the present invention, the disclosed Application is aimed to propose and provide a great number of merits and advantages which can be accomplished by adopting the present invention. Therefore, in view of all, it is obvious that the present invention is not only novel and inventive but also believed to be advantageous of solving and avoiding the conventional issues existing in the prior arts. It is believed that for people who are skilled in the art and having understandings and technical backgrounds to the present invention, it would be allowed for them to make various modifications or changes depending on different circuit regulations /d/ or specifications without departing from the scope of the invention. That is to say, the present invention is certainly not limited thereto. As a result, when compared to the prior arts, it is obvious that the present invention apparently shows much more effective performances than before. In addition, it is believed that the present invention is instinct, effective and highly competitive for IC technology and industries in the market nowadays, whereby having extraordinary availability and competitiveness for future industrial developments and being in condition for early allowance.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A transmitter circuit having additional delay path, applicable to a digital isolator module, which comprises a receiver circuit and an isolation barrier connected between the transmitter circuit and the receiver circuit;

wherein the transmitter circuit is adapted to receive a data input signal and operable to generate a first transmitter output signal and a second transmitter output signal in response to the data input signal, and the second transmitter output signal is a delay signal of the first transmitter output; and wherein the isolation barrier is coupled to the transmitter circuit and receiving the first transmitter output signal and the second transmitter output signal, and the isolation barrier is operable to develop a first isolated output signal and a second isolated output signal respectively in response to the first transmitter output signal and the second transmitter output signal; and wherein the receiver circuit is coupled to the isolation barrier and receiving the first isolated output signal and the second isolated output signal, such that the receiver circuit is operable to generate a data output signal in response to the first isolated output signal and the second isolated output signal.

2. The transmitter circuit having additional delay path according to claim 1, wherein the first transmitter output signal is periodic since a voltage level of the data input signal is followed by a voltage level of the first transmitter output signal and the data input signal is periodic.

3. The transmitter circuit having additional delay path according to claim 1, wherein the first transmitter output signal comprises a first division signal and a second division signal, the transmitter circuit starts to generate the first division signal of the first transmitter output signal responsive to a first transition of the data input signal from a first logic state to a second logic state and terminate generating the first division signal of the first transmitter output signal when the data input signal is still in the second logic state; and wherein the transmitter circuit starts to generate the second division signal of the first transmitter output signal responsive to a second transition of the data input signal from the second logic state to the first logic state and terminate generating the second division signal of the first transmitter output signal when the data input signal is still in the first logic state.

4. The transmitter circuit having additional delay path according to claim 3, wherein the first division signal of the first transmitter output signal comprises a first plurality of pulse carrier, the second division signal of the first transmitter output signal comprises a second plurality of pulse carrier, and a number of the first plurality of pulse carrier of the first division signal of the first transmitter output signal and that of the second plurality of pulse carrier of the second division signal of the first transmitter output signal are different.

5. The transmitter circuit having additional delay path according to claim 4, wherein a frequency of the first plurality of pulse carrier of the first division signal of the first transmitter output signal and that of the second plurality of pulse carrier of the second division signal of the first transmitter output signal are variable.

6. The transmitter circuit having additional delay path according to claim 4, wherein an amplitude of the first plurality of pulse carrier of the first division signal of the first transmitter output signal and that of the second plurality of pulse carrier of the second division signal of the first transmitter output signal are variable.

7. The transmitter circuit having additional delay path according to claim 3, wherein a voltage level of the first transmitter output signal after the transmitter circuit terminates generating the first division signal of the first transmitter output signal or the second division signal of the first transmitter output signal is variable.

8. The transmitter circuit having additional delay path according to claim 1, wherein the second transmitter output signal is periodic since a voltage level of the data input signal is followed by a voltage level of the second transmitter output signal and the data input signal is periodic.

9. The transmitter circuit having additional delay path according to claim 1, wherein the second transmitter output signal is obtained by delaying the first transmitter output signal by a half period of duty time (T*½) of the first transmitter output signal, wherein T is a duty time of the first transmitter output signal.

10. The transmitter circuit having additional delay path according to claim 4, wherein a first operational time of the first division signal of the first transmitter output signal is a first time segment between the transmitter circuit starts to generate the first plurality of pulse carrier and to terminate generating the first plurality of pulse carrier, a second operational time of the second division signal of the first transmitter output signal is a second time segment between the transmitter circuit starts to generate the second plurality of pulse carrier and to terminate generating the second plurality of pulse carrier, and the first operational time of the first division signal of the first transmitter output signal and the second operational time of the second division signal of the first transmitter output signal are different.

11. The transmitter circuit having additional delay path according to claim 10, wherein the transmitter circuit comprises:

a rising and falling converter, adapted to receive the data input signal and accordingly output a converted data input signal in response to a rising edge of the data input signal and a falling edge of the data input signal, wherein the converted data input signal comprises a first partition signal and a second partition signal, the rising and falling converter starts to generate the first partition signal responsive to the rising edge of the data input signal and terminate generating the first partition signal before the falling edge of the data input signal, and wherein the rising and falling converter starts to generate the second partition signal responsive to the falling edge of the data input signal and terminate generating the second partition signal before a next rising edge of the data input signal, and wherein a first working time of the first partition signal of the converted data input signal and a second working time of the second partition signal of the converted data input signal are different;

a delay and logic unit, adapted to electrically connect with the rising and falling converter for receiving the converted data input signal and accordingly generating a carrier signal, wherein the carrier signal comprises a plurality of pulses between the rising edge of the data input signal and the falling edge of the data input signal;

an AND gate, being electrically connected with the rising and falling converter and the delay and logic unit for receiving the converted data input signal and the carrier signal, and outputting the first transmitter output signal; and a delay circuit, being electrically connected with the AND gate, wherein the delay circuit is operable to receive the first transmitter output signal, delay the first transmitter output signal and output the second transmitter output signal.

12. The transmitter circuit having additional delay path according to claim 3, wherein the first transition of the data input signal from the first logic state to the second logic state is in response to a rising edge of the data input signal.

13. The transmitter circuit having additional delay path according to claim 3, wherein the second transition of the data input signal from the second logic state to the first logic state is in response to a falling edge of the data input signal.

14. The transmitter circuit having additional delay path according to claim 11, wherein a number of the plurality of pulses of the carrier signal is limited and definite.

15. The transmitter circuit having additional delay path according to claim 11, wherein the first operational time of the first division signal of the first transmitter output signal is equal to the first working time of the first partition signal of the converted data input signal, and the second operational time of the second division signal of the first transmitter output signal is equal to the second working time of the second partition signal of the converted data input signal.

16. The transmitter circuit having additional delay path according to claim 11, wherein the delay and logic unit comprises:

multiple delay cells which are connected in series to receive the converted data input signal, delay the converted data input signal sequentially and output multiple delayed signals, wherein a signal delay time of each of the multiple delay cells is one period;

multiple multiplexers, wherein each of the multiple multiplexers includes two input ends and an output end, the two input ends are electrically connected to successive two of the converted data input signal and the multiple delayed signals to accordingly generate a multiplexer signal at the output end; and an OR gate, adapted to receive a plurality of the multiplexer signal from the output end of the multiple multiplexers and generate the carrier signal.

17. The transmitter circuit having additional delay path according to claim 16, wherein the multiplexer signal turns to a high voltage level when a former one of the successive two of the converted data input signal and the multiple delayed signals is at the high voltage level and a later one of the successive two of the converted data input signal and the multiple delayed signals is at a low voltage level.

18. The transmitter circuit having additional delay path according to claim 11, wherein the rising and falling converter comprises an inverter, a first transmission gate, a second transmission gate, a third transmission gate, a fourth transmission gate and an NOR gate, wherein the inverter receives the data input signal and outputs an inverted data input signal, a first input end of the NOR gate is electrically connected with the first transmission gate and the second transmission gate, a second input end of the NOR gate is electrically connected with the third transmission gate and the fourth transmission gate, the first transmission gate and the third transmission gate are further connected with an input and an output of the inverter, respectively, and wherein the data input signal is delayed by a first period and a second period to respectively control the first transmission gate and the fourth transmission gate, the inverted data input signal is delayed by the first period and the second period to respectively control the second transmission gate and the third transmission gate, such that the NOR gate outputs the converted data input signal.

19. The transmitter circuit having additional delay path according to claim 18, wherein when the first period is longer than the second period, the first working time of the first partition signal of the converted data input signal is longer than the second working time of the second partition signal of the converted data input signal.

20. The transmitter circuit having additional delay path according to claim 18, wherein when the second period is longer than the first period, the second working time of the second partition signal of the converted data input signal is longer than the first working time of the first partition signal of the converted data input signal.

21. The transmitter circuit having additional delay path according to claim 11, wherein the delay circuit comprises at least one inverting unit, and the at least one inverting unit is forming by electrically connecting two inverters in series, such that the least one inverting unit is operable to receive the first transmitter output signal and output the second transmitter output signal.

22. The transmitter circuit having additional delay path according to claim 21, wherein when the delay circuit comprises a plurality of the inverting units, the plurality of the inverting units are electrically connected in cascade for receiving the first transmitter output signal and outputting the second transmitter output signal.

23. The transmitter circuit having additional delay path according to claim 1, wherein the isolation barrier comprises at least a pair of isolation capacitance, and each of the pair of isolation capacitance is adapted to develop the first isolated output signal and the second isolated output signal respectively upon receiving the first transmitter output signal and the second transmitter output signal.

* * * * *